(12) United States Patent
Uchida

(10) Patent No.: US 6,755,013 B2
(45) Date of Patent: Jun. 29, 2004

(54) APPARATUS AND METHOD FOR DETECTING DETERIORATION OF CATALYST OF INTERNAL COMBUSTION ENGINE

(75) Inventor: Takahiro Uchida, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/265,387

(22) Filed: Oct. 7, 2002

(65) Prior Publication Data

US 2003/0070420 A1 Apr. 17, 2003

(30) Foreign Application Priority Data

Oct. 11, 2001 (JP) ........................................ 2001-313840

(51) Int. Cl.[7] .............................................. F01N 3/00
(52) U.S. Cl. ........................................ 60/277; 60/274
(58) Field of Search ........................ 60/274, 277, 285, 60/299

(56) References Cited

U.S. PATENT DOCUMENTS

| | | | | |
|---|---|---|---|---|
| 5,337,555 A | * | 8/1994 | Tokuda et al. | ................ 60/276 |
| 5,412,941 A | * | 5/1995 | Suzuki et al. | ................ 60/276 |
| 5,626,014 A | * | 5/1997 | Hepburn et al. | ............... 60/274 |
| 5,724,809 A | * | 3/1998 | Mitsutani et al. | ............. 60/276 |
| 6,073,440 A | * | 6/2000 | Douta et al. | ................... 60/277 |

FOREIGN PATENT DOCUMENTS

| | | |
|---|---|---|
| JP | A 5-133264 | 5/1993 |
| JP | A 11-36848 | 2/1999 |
| JP | A 11-132031 | 5/1999 |

* cited by examiner

*Primary Examiner*—Thomas Denion
*Assistant Examiner*—Diem Tran
(74) *Attorney, Agent, or Firm*—Oliff & Berridge, PLC

(57) ABSTRACT

A catalyst deterioration detection apparatus and method detect deterioration of a catalyst connected to an exhaust passage of an internal combustion engine by: determining a deterioration characteristic value that indicates a state of deterioration of the catalyst; determining a temperature of the catalyst occurring at a time of the determination of the deterioration characteristic value, as a detection-time catalyst temperature; determining an amount of intake air occurring at the time of the determination of the deterioration characteristic value, as a detection-time amount of air, determining whether the detection-time catalyst temperature and the detection-time amount of air satisfy a predetermined relationship; and prohibiting a determination of the state of deterioration of the catalyst based on the deterioration characteristic value if the detection-time catalyst temperature and the detection-time amount of air do not satisfy the predetermined relationship.

32 Claims, 11 Drawing Sheets

APPARATUS AND METHOD FOR DETECTING DETERIORATION OF CATALYST OF INTERNAL COMBUSTION ENGINE

INCORPORATION BY REFERENCE

The disclosure of Japanese Patent Application No. 2001-313840 filed on Oct. 11, 2001, including the specification, drawings and abstract is incorporated herein by reference in its entirety.

BACKGROUND OF THE INVENTION

1. Field of Invention

The invention relates to a catalyst deterioration detection apparatus of an internal combustion engine, and a detection method performed by the apparatus. More particularly, the invention relates to a catalyst deterioration detection apparatus for detecting deterioration of a catalyst for purifying emissions from an internal combustion engine, and a detection method performed by the detector apparatus.

2. Description of Related Art

A catalyst for purifying exhaust gas is disposed in an exhaust passage of a vehicle-installed internal combustion engine. This catalyst has a capability of storing an appropriate amount of oxygen. If exhaust gas contains unburned components, such as HC, CO, etc., the catalyst causes oxidation of the unburned components using stored oxygen. If exhaust gas contains oxides, such as NOx and the like, the catalyst causes reduction of the oxides, and absorbs and stores oxygen produced by the reduction reactions.

The catalyst disposed in an exhaust passage is thus intended to purify exhaust emissions. Thus, the emission control capability of the catalyst is greatly affected by the oxygen storage capability of the catalyst. Therefore, the emission control capability degradation state of the catalyst can be determined based on the maximum amount of oxygen that the catalyst is able to store, that is, the oxygen storage capacity.

FIG. 11 indicates a relationship between the catalyst temperature and the oxygen storage capacity (OSC). More specifically, a curve (1) in FIG. 11 indicates a temperature-OSC relationship exhibited by a normal catalyst with respect to fuel having a low sulfur concentration. A curve (2) indicates a temperature-OSC relationship exhibited by a normal catalyst with respect to fuel containing a large amount of sulfur. Furthermore, a curve (3) indicates a temperature-OSC relationship exhibited by a deteriorated catalyst. A curve (4) indicates a temperature-OSC relationship exhibited by a further deteriorated catalyst.

As indicated in FIG. 11, the oxygen storage capacity OSC of the catalyst is dependent on the catalyst temperature THC. This dependence changes in accordance with the deterioration of the catalyst. For example, if a low-sulfur concentration fuel is used, a normal-state catalyst exhibits relatively great oxygen storage capacity OSC even at a relatively low catalyst temperature range as indicated by the curve (1). In contrast, if the catalyst is lightly deteriorated, the oxygen storage capacity OSC of the catalyst becomes relatively high in a relatively high catalyst temperature range as indicated by the curve (3). As the deterioration of the catalyst further progresses, the oxygen storage capacity OSC of the catalyst remains low regardless of the catalyst temperature. Therefore, it is possible to determine whether the catalyst is normal by checking whether a sufficient oxygen storage capacity OSC is secured when the catalyst temperature is, for example, within a range indicated by reference numeral (5) in FIG. 11.

However, it is known that the oxygen storage capacity OSC of the catalyst varies in accordance with variation in the quality of fuel used, more specifically, variation in the concentration of a sulfur component contained in fuel. That is, even if the catalyst is normal, a high sulfur component concentration in fuel causes a smaller oxygen storage capacity OSC as indicated by the curve (2) than a low sulfur component concentration (curve (1)) in fuel. In this case, in order to determine whether the catalyst is normal based on the oxygen storage capacity OSC, it is necessary to distinguish whether the catalyst is exhibiting the OSC characteristic indicated by the curve (2) or the OSC characteristic indicated by the curve (3). Therefore, if variations in the quality of fuels distributed in the market are taken into consideration, the case where the deteriorated state of the catalyst can be determined based on the oxygen storage capacity OSC is limited only to a case where the catalyst temperature is within a narrow range indicated by reference numeral (6).

The catalyst temperature changes in accordance with the amount of intake air. That is, if the amount of intake air is large, the catalyst temperature becomes high due to a large amount of high-temperature exhaust gas supplied to the catalyst. Conversely, if the amount of intake air is small, the catalyst temperature becomes low due to a small amount of flow of exhaust gas. Therefore, at a transitional time when the amount of intake air sharply increases, such as a time of acceleration of the vehicle or the like, there occurs a temporary event where the amount of intake air (amount of exhaust gas) becomes large while the catalyst temperature remains low.

If the state where the amount of intake air has increased continues, the catalyst temperature eventually becomes high, and enters the range (6). Even in that case, however, until the catalyst temperature sufficiently rises, there occurs a state where the amount of intake air is excessively large relatively to the catalyst temperature so that sufficient control of exhaust emissions (oxidation and reduction thereof) cannot be achieved, that is, there occurs a through-flow of exhaust gas. That is, during a period from a sharp increase in the amount of intake air until a sufficient rise of the catalyst temperature, an event similar to the event that occurs in the case of deterioration of the catalyst occurs even though the catalyst is actually normal. Therefore, during a certain time period from a transitional change in the operation state of the internal combustion engine until the amount of intake air and the catalyst temperature become unbalanced, it is preferable that the determination regarding deterioration of the catalyst be avoided even under a condition in which the catalyst temperature converges into the range (6) (first requirement).

If high temperature of the catalyst is caused by continuation of a travel in an accelerating state or with large amounts of air and is immediately followed by a travel with a small amount of air, exhaust gas may possibly be purified to a sufficient extent even though deterioration of the catalyst has considerably progressed. Therefore, it is preferable that determination regarding deterioration of the catalyst be avoided also in the case where there is unbalance between the amount of intake air and the catalyst temperature. However, if in the aforementioned case, deterioration of the catalyst has sufficiently progressed (see the curve (4)), the abnormality of the catalyst can be precisely determined, so that the detection should not be simply suspended (second requirement).

Japanese Patent Application Laid-Open No. 11-36848 discloses a catalyst deterioration detection apparatus that meets the aforementioned first requirement. This apparatus has a function of monitoring the rate of change of the amount of intake air, and of determining whether the vehicle is accelerating or decelerating or is in a steady running state based on the rate of change. This apparatus stores in a memory a lower limit-side criterion value and an upper limit-side criterion value that are to be compared with the rate of change of the amount of intake air. The criterion values are set so that the absolute values thereof increase with increases in the elapsed time following the beginning of an acceleration or deceleration of the vehicle. The aforementioned conventional apparatus permits execution of determination regarding deterioration of the catalyst only if the rate of change of the amount of intake air is between the upper limit-side and lower limit-side criterion values.

According to this conventional apparatus, during a short time period after a shift to acceleration or deceleration of the vehicle, that is, after a shift to a transitional state of the vehicle, determination regarding deterioration of the catalyst can be permitted only if there is substantially no change in the amount of intake air. If there is a great change in the amount of intake air, determination regarding deterioration of the catalyst can be permitted only in the case where a sufficiently long time has elapsed following the shift to a transitional state of the vehicle. That is, the aforementioned conventional apparatus is able to permit execution of determination regarding deterioration of the catalyst only if it can be estimated that the catalyst temperature and the amount of intake air are balanced, regardless of the magnitude of change in the amount of intake air. Therefore, the aforementioned conventional apparatus is able to accurately determine a state of deterioration of the catalyst based on the oxygen storage capacity OSC.

However, the above-described conventional apparatus tends to unnecessarily prohibit execution of determination regarding deterioration of the catalyst if small amounts of acceleration and deceleration are repeated (microscopic view) during a larger accelerating or decelerating state (macroscopic view).

During operation of a vehicle, there occurs a situation where small amounts of acceleration and deceleration are repeated (microscopic view) as indicated in FIG. 12B during a larger accelerating state (macroscopic view) as indicated in FIG. 12A. In this situation, the above-described conventional apparatus resets the elapsed time following the shift to a transitional state every time the vehicle shifts from an acceleration to a deceleration or from a deceleration to an acceleration in a microscopic view. Therefore, the apparatus experiences an event where determination regarding deterioration of the catalyst is not executed even though the amount of intake air and the catalyst temperature are balanced.

As described above, the conventional catalyst deterioration detection apparatus adopts a construction in which determination regarding deterioration of the catalyst is executed only under a severely limited condition, in order to determine deterioration of the catalyst with good precision. Therefore, the conventional catalyst deterioration detection apparatus is able to determine deterioration of the catalyst with high precision if the determination can be executed, but is not always able to execute the determination with a desired frequency.

SUMMARY OF THE INVENTION

Accordingly, it is an object of the invention to provide a catalyst deterioration detection apparatus and method capable of executing high-precision determination regarding deterioration of the catalyst with high frequency, and a detection method thereof.

In order to achieve the aforementioned and/or other objects, one aspect of the invention provides a catalyst deterioration detection apparatus and method for detecting deterioration of a catalyst provided in an exhaust passage of an internal combustion engine. A deterioration characteristic value that indicates a state of deterioration of the catalyst is determined. A temperature of the catalyst occurring at a time of the determination of the deterioration characteristic value is determined as a detection-time catalyst temperature. An amount of intake air occurring at the time of the determination of the deterioration characteristic value is determined as a detection-time amount of air. A determination is made as to whether the detection-time catalyst temperature and the detection-time amount of air satisfy a predetermined relationship. A state of deterioration of the catalyst based on the deterioration characteristic value can be determined. However, the determination of the state of deterioration of the catalyst based on the deterioration characteristic value is prohibited if the detection-time catalyst temperature and the detection-time amount of air do not satisfy the predetermined relationship.

According to the catalyst deterioration detection apparatus and the detection method thereof, even if the catalyst temperature and the amount of intake air becomes unbalanced, false determination of the state of deterioration of the catalyst caused by the unbalance can be prevented. Therefore, in this aspect of the invention, there is no need to limit the situation where determination of the state of deterioration of the catalyst is allowed, to a situation where such unbalance will not occur. Therefore, according to this aspect of the invention, determination regarding deterioration of the catalyst can be performed with good-precision and high frequency.

In accordance with another aspect of the invention, a catalyst deterioration detection apparatus and method detects deterioration of a catalyst provided in an exhaust passage of an internal combustion engine. A deterioration characteristic value that indicates a state of deterioration of the catalyst is determined. A temperature of the catalyst occurring at a time of the determination of the deterioration characteristic value is determined as a detection-time catalyst temperature. An amount of intake air occurring at the time of the determination of the deterioration characteristic value is determined as a detection-time amount of air. A target catalyst temperature corresponding to the detection-time amount of air is calculated. An amount of separation between the detection-time catalyst temperature and the target catalyst temperature also is calculated. A state of deterioration of the catalyst based on the deterioration characteristic value can be determined. However, the determination of the state of deterioration of the catalyst based on the deterioration characteristic value is prohibited if the amount of separation is greater than a predetermined amount.

According to the above-described catalyst deterioration detection apparatus and method, the unbalance between the catalyst temperature and the amount of intake air can be determined based on the magnitude of amount of separation between the detection-time catalyst temperature and the target catalyst temperature. Then, using the result of determination, determination regarding deterioration of the catalyst can be performed with good precision and high frequency.

BRIEF DESCRIPTION OF THE DRAWINGS

The above mentioned and other objects, features, advantages, technical and industrial significance of this invention will be better understood by reading the following detailed description of exemplary embodiments of the invention, when considered in connection with the accompanying drawings, in which.

DETAILED DESCRIPTION OF PREFERRED EMBODIMENTS

Figure 1:
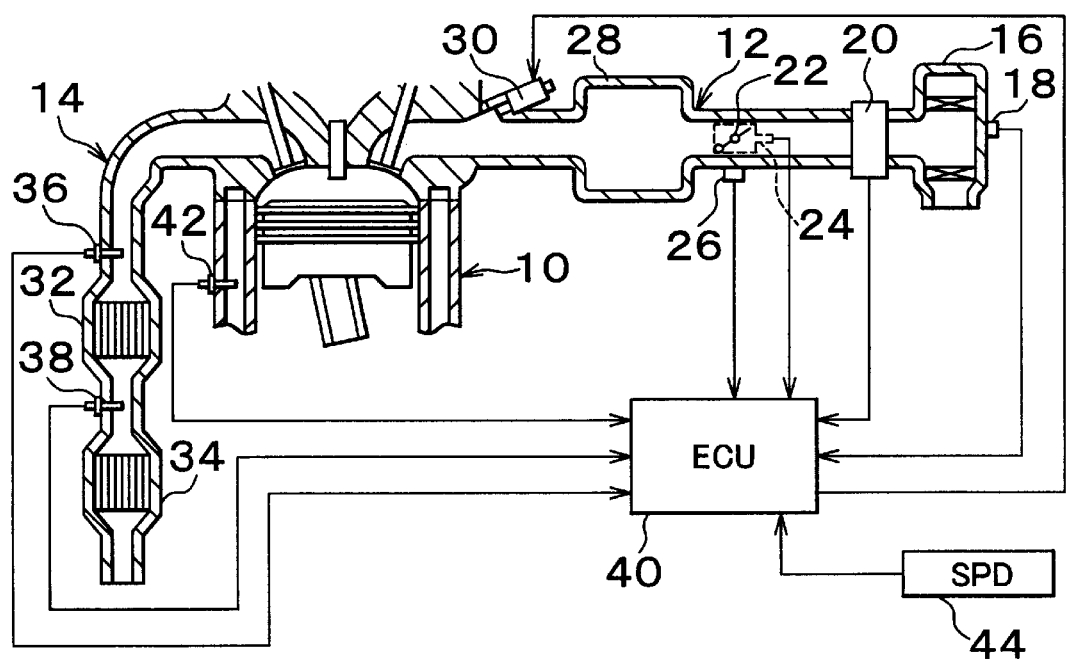
FIG. 1 is a diagram illustrating a structure of a catalyst deterioration detection apparatus in accordance with a first embodiment of the invention.

In the following description and the accompanying drawings, the present invention will be described in more detail with reference to exemplary embodiments.

Embodiments of the invention will be described hereinafter with reference to the drawings. Like components of the embodiments are represented by like reference characters in the drawings, and will not be described in a redundant manner.

First Embodiment

FIG. 1 is a diagram illustrating an internal combustion engine 10 equipped with a catalyst deterioration detection apparatus in accordance with a first embodiment of the invention, and a structure around the engine 10. An intake passage 12 and an exhaust passage 14 are connected in communication to the engine 10. An air filter 16 is provided in an upstream-side end portion of the intake passage 12. The air filter 16 is provided with an intake temperature sensor 18 for detecting the intake air temperature THA (i.e., external air temperature).

An air flow meter 20 is disposed downstream of the air filter 16. The air flow meter 20 is a sensor for detecting the amount of intake air Ga that flows in the intake passage 12. A throttle valve 22 is provided downstream of the air flow meter 20. Disposed near the throttle valve 22 are a throttle sensor 24 that detects the degree of throttle opening TA, and an idle switch 26 that turns on when the throttle valve 22 is completely closed.

A surge tank 28 is provided downstream of the throttle valve 22. Disposed further downstream of the surge tank 28 is a fuel injection valve 30 for injecting fuel into an intake port of the engine 10.

The exhaust passage 14 is provided with an upstream-side catalyst 32 and a downstream-side catalyst 34 that are arranged in series. The catalysts 32, 34 are able to store a certain amount of oxygen. If exhaust gas contains unburned components, such as HC, CO, etc., the catalysts 32, 34 cause oxidation of the unburned components using oxygen stored in the catalysts. If exhaust gas contains oxide components, such as NOx and the like, the catalysts cause reduction thereof, and absorb oxygen released from the oxide components. Exhaust gas discharged from the engine 10 is purified due to the processes caused in the catalysts 32, 34.

An air-fuel ratio sensor 36 and an $O_2$ sensor 38 are disposed in the exhaust passage 14 at an upstream side and a downstream side, respectively, of the upstream-side catalyst 32. The air-fuel ratio sensor 36 is a sensor that detects the oxygen concentration in exhaust gas. The $O_2$ sensor 38 is a sensor that detects whether the oxygen concentration in exhaust gas is greater or less than a predetermined value. More specifically, if the exhaust air-fuel ratio is on the fuel-rich side, the $O_2$ sensor 38 produces an output "1" until the air-fuel ratio shifts to the fuel-lean side. If the exhaust air-fuel ratio is on the fuel-lean side, the $O_2$ sensor 38 produces an output "0" until the air-fuel ratio shifts to the rich side. The $O_2$ sensor 38 may be replaced by an air-fuel ratio sensor.

The air-fuel ratio sensor 36 makes it possible to detect the air-fuel ratio of a mixture burned in the engine 10, based on the oxygen concentration in exhaust gas that flows into the upstream-side catalyst 32. The $O_2$ sensor 38 makes it possible to determine whether a fuel-rich exhaust gas (exhaust gas containing HC, CO, etc.) or a fuel-lean exhaust gas (exhaust gas containing NOx or the like) has flown out to the downstream side of the upstream-side catalyst 32.

The catalyst deterioration detection apparatus of this embodiment has an ECU (electronic control unit) 40 as shown in FIG. 1. The ECU 40 is connected with the aforementioned various sensors and the fuel injection valve 30, and is also connected with a water temperature sensor 42 for detecting the temperature of cooling water THW of the engine 10, a vehicle speed sensor 44 for detecting the vehicle speed SPD, etc.

In the system as shown in FIG. 1, exhaust gas discharged from the engine 10 is first purified (subjected to emission control processes) in the upstream-side catalyst 32. Exhaust emissions that are not removed by the upstream-side catalyst 32 are subjected to emission control processes in the downstream-side catalyst 34. Since the upstream-side catalyst 32 is disposed at a location close to the engine 10, the upstream-side catalyst 32 is heated to an activation temperature earlier than the downstream-side catalyst 34. Therefore, the upstream-side catalyst 32 delivers high emission control performance immediately after startup of the engine 10. In order to always provide proper emission control performance in this system, it is necessary to promptly detect deterioration of the upstream-side catalyst 32.

As mentioned above, the upstream-side catalyst 32 controls exhaust emissions by releasing oxygen into fuel-rich exhaust gas, and by absorbing oxygen present in an excess amount in fuel-lean exhaust gas. Therefore, the emission control capability of the upstream-side catalyst 32 decreases with decreases in the maximum amount of oxygen that can be stored in the upstream-side catalyst 32, that is, the oxygen storage capacity OSC of the upstream-side catalyst 32. Therefore, the catalyst deterioration detection apparatus of the embodiment detects the oxygen storage capacity OSC of the upstream-side catalyst 32, and determines deterioration of the upstream-side catalyst 32 based on the detected value of the oxygen storage capacity.

Figure 2:
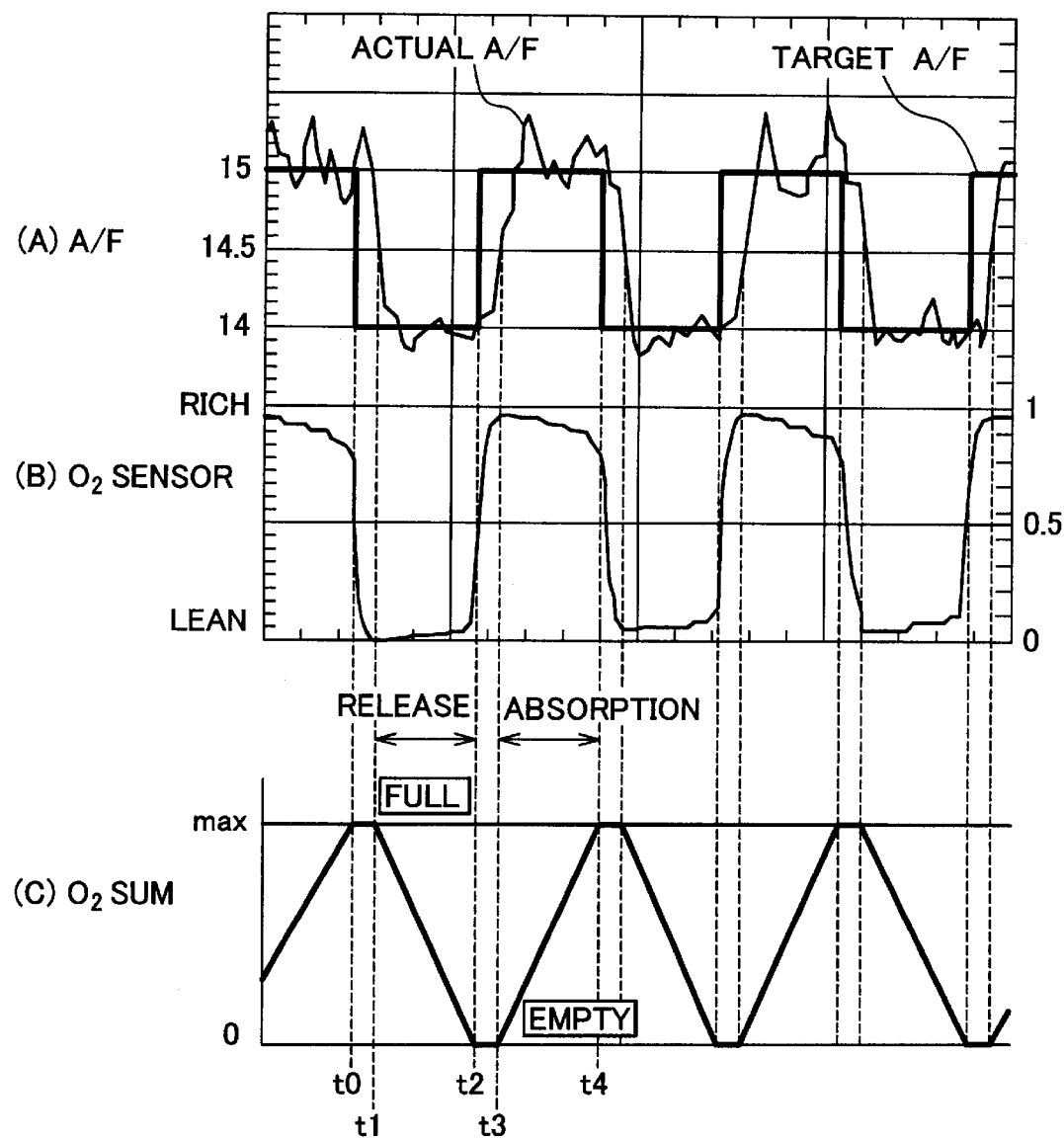
FIG. 2 is a timing chart for explaining a principle detecting the oxygen storage capacity OSC of a catalyst in the catalyst deterioration detection apparatus of the first embodiment of the invention.

FIG. 2 is a timing chart for explanation of a principle in the catalyst deterioration detection apparatus of the embodiment detecting the oxygen storage capacity OSC of the upstream-side catalyst 32. More specifically, a graph (A) in FIG. 2 indicates a waveform of the air-fuel ratio (target A/F) of mixture supplied to the engine 10 during the detection of the oxygen storage capacity OSC, and a waveform of the output of the air-fuel ratio sensor 36, that is, the air-fuel ratio (actual A/F) of exhaust gas that flows into the upstream-side catalyst 32, during the detection. A graph (B) in FIG. 2 indicates changes that occur in the output of the $O_2$ sensor 38 during the detection. A graph (C) in FIG. 2 indicates changes in the integrated amount $O_2$SUM of oxygen stored in the upstream-side catalyst 32.

When detecting the oxygen storage capacity of the upstream-side catalyst 32, the catalyst deterioration detection apparatus of the embodiment first forcibly fixes the target A/F to the fuel-rich or fuel-lean side. FIG. 2 indicates a case where the target A/F is fixed to the fuel-lean side until a time point t0. While the target A/F is fixed to the fuel-lean side, the output of the air-fuel ratio sensor 36 assumes values that are deviated to the fuel-lean side as indicated in the graph (A) of FIG. 2. During this period, the upstream-side catalyst 32 serves to control exhaust emissions by absorbing oxygen present in excess amount in exhaust gas. Therefore, the integrated oxygen storage $O_2$SUM of the upstream-side catalyst 32 increases with elapse of time, and reaches a maximum at the time point t0, as indicated in the graph (C) of FIG. 2. That is, the upstream-side catalyst 32 reaches a state where oxygen is stored fully up to the oxygen storage capacity OSC, at the time point t0. Hereinafter, this state will be referred to as "maximum oxygen storage state".

The upstream-side catalyst 32 in the maximum oxygen storage state cannot store any more oxygen, and is therefore no longer able to purify exhaust gas having a fuel-lean air-fuel ratio. Therefore, after the time point t0 when the upstream-side catalyst 32 reaches the maximum oxygen storage state, exhaust gas having a fuel-lean air-fuel ratio begins to flow out to the downstream side of the upstream-side catalyst 32. Upon the outflow of fuel-lean exhaust gas to the downstream side of the upstream-side catalyst 32, the $O_2$ sensor 38 produces a fuel-lean output (0) to indicate that the exhaust gas is fuel-lean. After that, the $O_2$ sensor 38 maintains the output (0) until the air-fuel ratio of exhaust gas switches to the fuel-rich side. Therefore, by monitoring the output of the $O_2$ sensor 38, it is possible to detect the time at which fuel-lean exhaust gas starts to flow out to the downstream side of the upstream-side catalyst 32, that is, the time at which the upstream-side catalyst 32 reaches the maximum oxygen storage state.

At the time point when the output of the $O_2$ sensor 38 switches from the rich output (1) to the lean output (0), the catalyst deterioration detection apparatus of the embodiment reverses the target A/F to the fuel-rich side. After the target A/F shifts to the fuel-rich side, the air-fuel ratio of exhaust gas flowing into the upstream-side catalyst 32 eventually shifts to the fuel-rich side. In FIG. 2, the time point t1 at which the output (actual A/F) of the air-fuel ratio sensor 36 changes from a lean side-deviated value to a rich side-deviated value is a time point at which exhaust gas having a fuel-rich-side air-fuel ratio begins to flow into the upstream-side catalyst 32.

As exhaust gas having a rich-side air-fuel ratio begins to flow into the upstream-side catalyst 32, the upstream-side catalyst 32 purifies the exhaust gas while releasing oxygen. Therefore, as indicated in the graph (C) of FIG. 2, the integrated oxygen storage $O_2$SUM of the upstream-side catalyst 32 begins to decrease after the time point t1. If this state continues, the entire amount of oxygen stored in the upstream-side catalyst 32 is eventually released, so that the integrated oxygen storage $O_2$SUM reaches a minimum. FIG. 2 indicates an example case where the integrated oxygen storage $O_2$SUM reaches a minimum at a time point t2, that is, an example case where at the time point t2, the upstream-side catalyst 32 reaches a state where the entire amount of oxygen stored is released. Hereinafter, this state will be referred to as "minimum oxygen storage state".

The upstream-side catalyst 32 in the minimum oxygen storage state cannot release any more oxygen, and is therefore no longer able to purify exhaust gas having a rich-side air-fuel ratio. Therefore, as the upstream-side catalyst 32 reaches the minimum oxygen storage state, exhaust gas having a rich-side air-fuel ratio begins to flow out to the downstream side of the upstream-side catalyst 32, so that the output of the $O_2$ sensor 38 switches from the lean output (0) to the rich output (1). Thus, by monitoring the output of the $O_2$ sensor 38, it is possible to detect the time at which fuel-rich exhaust gas begins to flow out to the downstream side of the upstream-side catalyst 32, that is, the time at which the upstream-side catalyst 32 reaches the minimum oxygen storage state.

At the time point when the output of the $O_2$ sensor 38 switches from the lean output (0) to the rich output (1), the catalyst deterioration detection apparatus of the embodiment reverses the target A/F to the fuel-lean side (time point t2). After the target A/F shifts to the fuel-lean side, the air-fuel ratio of exhaust gas flowing into the upstream-side catalyst 32 eventually shifts to the fuel-lean side (time point t3).

As the air-fuel ratio of exhaust gas flowing into the upstream-side catalyst 32 shifts to the fuel-lean side, the upstream-side catalyst 32 starts purifying exhaust gas while storing oxygen again. Therefore, as indicated in the graph (C) of FIG. 2, the integrated oxygen storage $O_2$SUM of the upstream-side catalyst 32 starts increasing after the time point t3, and reaches the maximum at a time point t4. After that, the catalyst deterioration detection apparatus repeats the above-described process, that is, the upstream-side catalyst 32 cyclically reaches the maximum oxygen storage state and the minimum oxygen storage state.

The catalyst deterioration detection apparatus of the embodiment is able to determine the amount of oxygen that the upstream-side catalyst 32 absorbs per unit time, or the amount of oxygen that the upstream-side catalyst 32 releases per unit time, based on the exhaust gas air-fuel ratio A/F and the amount of intake air Ga. Hereinafter, the aforementioned amounts of oxygen will be collectively referred to as "oxygen storage $O_2AD$", where $O_2AD$ is positive in the case of absorption of oxygen, and is negative in the case of release of oxygen. The catalyst deterioration detection apparatus of the embodiment computes the oxygen storage capacity OSC by integrating the oxygen storage $O_2AD$ during the process of transition of the upstream-side catalyst 32 from the minimum oxygen storage state to the maximum oxygen storage state, or the reverse process.

Figure 3:
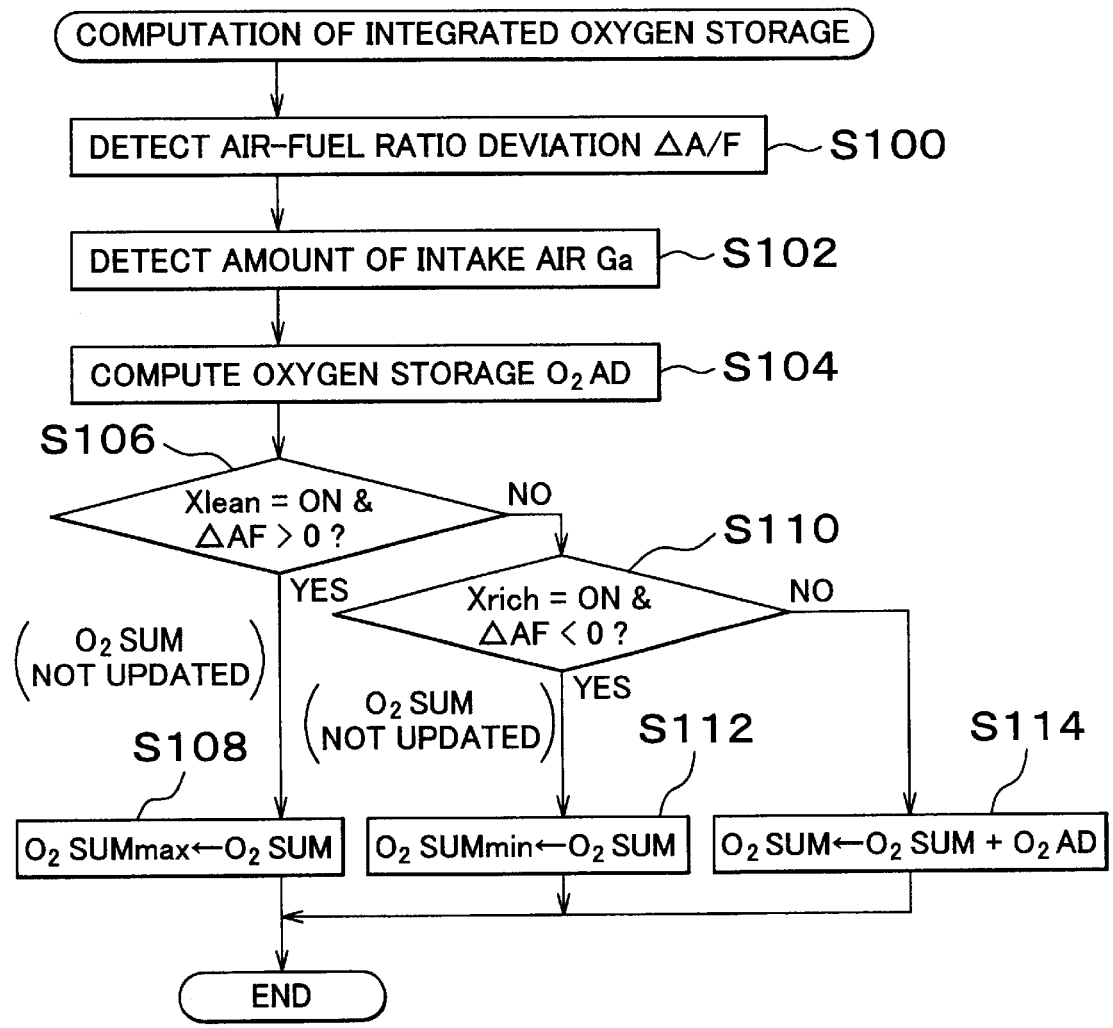
FIG. 3 is a flowchart illustrating a routine executed by the catalyst deterioration detection apparatus of the first embodiment of the invention to compute the oxygen storage capacity.

FIG. 3 is a flowchart illustrating an oxygen storage computation routine executed by the ECU 40 as a pre-operation for determining the oxygen storage capacity OSC. FIG. 3 is a periodic interrupt routine executed at predetermined time intervals.

In step S100 in the routine illustrated in FIG. 3, the ECU 40 computes an air-fuel ratio deviation $\Delta A/F$. The air-fuel ratio deviation $\Delta A/F$ is a difference between the air-fuel ratio detected by the air-fuel ratio sensor 36, that is, the air-fuel ratio of exhaust gas that flows into the upstream-side catalyst 32, and a stoichiometric air-fuel ratio A/Fst, and is computed as in the following equation:

$$\Delta A/F = A/F - A/Fst \quad (1)$$

Next, the amount of intake air Ga is detected based on the output of the air flow meter 20 (step S102).

Subsequently, on the basis of the air-fuel ratio deviation $\Delta A/F$ and the amount of intake air Ga, the ECU 40 determines the amount of oxygen that is absorbed into or released from the upstream-side catalyst 32 per unit time, that is, the oxygen storage $O_2AD$ (step S104).

The oxygen storage $O_2AD$ is computed in accordance with arithmetic expressions or a map stored in the ECU 40. The value of oxygen storage $O_2AD$ is positive if the air-fuel ratio of exhaust gas flowing into the upstream-side catalyst 32 is on the fuel-lean side (that is, if A/F>A/Fst, i.e., $\Delta AF>0$). Conversely, the value of oxygen storage $O_2AD$ is negative if the air-fuel ratio of exhaust gas flowing into the upstream-side catalyst 32 is on the fuel-rich side (that is, if A/F<A/Fst, i.e., $\Delta A/F<0$).

Next, it is determined whether a condition of a lean flag Xlean=ON and the air-fuel ratio deviation $\Delta A/F>0$ is met (step S106).

The lean flag Xlean is turned on if the $O_2$ sensor 38 disposed downstream of the upstream-side catalyst 32 produces the lean output (0). That is, in step S106, it is determined whether exhaust gas is fuel-lean on both the upstream side and the downstream side of the upstream-side catalyst 32.

The condition checked in step S106 is met if the upstream-side catalyst 32 has stored oxygen fully up to the oxygen storage capacity OSC and the oxygen storage does not change, that is, if the upstream-side catalyst 32 is in the maximum oxygen storage state (time t0 to t1 in FIG. 2). According to the routine illustrated in FIG. 3, if this condition is met, the present integrated oxygen storage $O_2SUM$ is stored as a maximum integrated oxygen storage $O_2SUMmax$ (step S108).

Conversely, if it is determined in step S106 that the condition is not met, it is then determined whether a condition of a rich flag Xrich=ON and the air-fuel ratio deviation $\Delta A/F<0$ is met (step S110).

The rich flag Xrich is turned on if the $O_2$ sensor 38 disposed downstream of the upstream-side catalyst 32 produces the rich output (1). That is, in step S110, it is determined whether exhaust gas is fuel-rich on both the upstream side and the downstream side of the upstream-side catalyst 32.

The condition checked in step S110 is met if the upstream-side catalyst 32 has completely released oxygen and the oxygen storage does not change, that is, if the upstream-side catalyst 32 is in the minimum oxygen storage state (time t2 to t3 in FIG. 2). According to the routine illustrated in FIG. 3, if this condition is met, the present integrated oxygen storage $O_2SUM$ is stored as a minimum integrated oxygen storage $O_2SUMmin$ (step S112).

If it is determined in step S110 that the condition is not met, it can be determined that the upstream-side catalyst 32 is presently absorbing or releasing oxygen and the amount of oxygen stored in the upstream-side catalyst 32 is continuously changing (time t1 to t2, and t3 to t4 in FIG. 2). In this case, according to the routine of FIG. 3, the ECU 40 performs a process of updating the integrated oxygen storage $O_2SUM$ by adding the oxygen storage $O_2AD$ computed in the present cycle of the routine to the integrated oxygen storage $O_2SUM$ computed in the previous cycle (step S114).

As is apparent from the foregoing description, according to the routine illustrated in FIG. 3, the integrated oxygen storage $O_2SUM$ can be increased or decreased in accordance with the increase or decrease in the amount of oxygen actually stored in the upstream-side catalyst 32. Then, the integrated oxygen storage $O_2SUM$ corresponding to the maximum oxygen storage state can be stored as a maximum integrated oxygen storage $O_2SUMmax$, and the integrated oxygen storage $O_2SUM$ corresponding to the minimum oxygen storage state can be stored as a minimum integrated oxygen storage $O_2SUMmin$. After these values are determined, the ECU 40 can compute the oxygen storage capacity OSC of the upstream-side catalyst 32 by subtracting the minimum integrated oxygen storage $O_2SUMmin$ from the maximum integrated oxygen storage $O_2SUMmax$.

Next, a technique used by the catalyst deterioration detection apparatus of the embodiment to determine whether the upstream-side catalyst 32 suffers from deterioration based on the oxygen storage capacity OSC of the upstream-side catalyst 32 will be described with reference to FIGS. 4 and 5.

In order to perform the determination regarding deterioration of the upstream-side catalyst 32 with good precision in the system of the embodiment, it is desirable that the oxygen storage capacity OSC be detected under a condition where the operation state of the engine 10 is stable. However, if detection of the oxygen storage capacity OSC is prohibited every time the engine 10 enters a transitional state, the opportunities to detect the oxygen storage capacity OSC will become very few, and therefore determination regarding deterioration of the upstream-side catalyst 32 cannot be performed with a desired frequency.

Therefore, when the catalyst deterioration detection apparatus of the embodiment is about to perform determination regarding deterioration of the upstream-side catalyst 32, the apparatus first detects the oxygen storage capacity OSC regardless of the operation state of the engine 10. Then, in an ex-post manner, the catalyst deterioration detection apparatus determines whether at the time of the detection, the engine 10 is in a transitional state in a macroscopic view. If it is determined that the engine 10 is in such a transitional state, the apparatus discards the detected value without using it for the determination regarding catalyst deterioration. This manner of detecting the oxygen storage capacity OSC will increase the frequency of the detection, so that determination regarding deterioration of the upstream-side catalyst 32 can be performed with high frequency.

Figure 4:
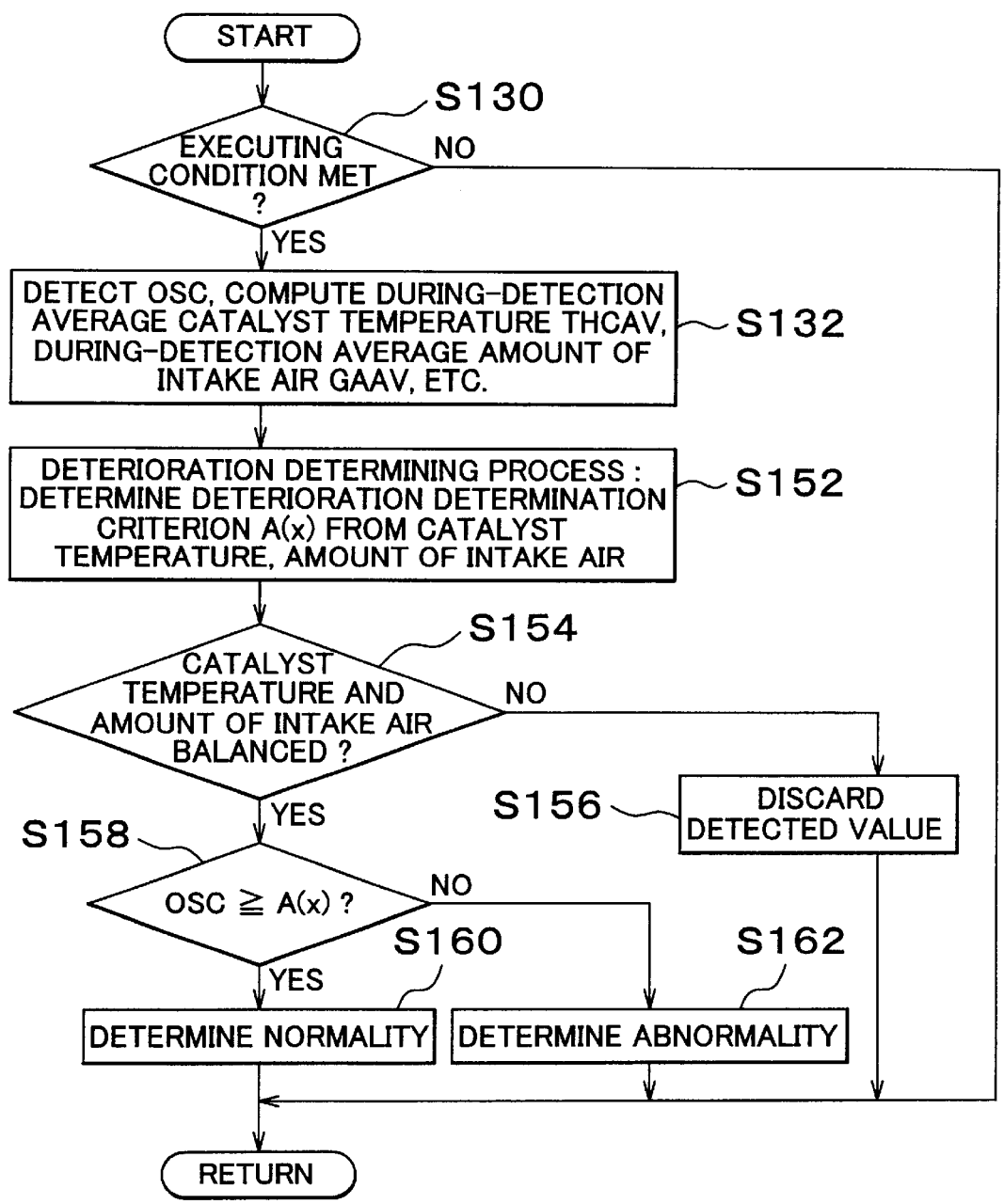
FIG. 4 is a flowchart illustrating a routine executed by the catalyst deterioration detection apparatus of the first embodiment of the invention to determine deterioration of the upstream-side catalyst based on the oxygen storage capacity.

FIG. 4 is a flowchart illustrating a routine executed by the ECU 40 to realize the aforementioned function. In the routine illustrated in FIG. 4, it is first determined whether a condition for executing the deterioration determination is met (step S130).

Specifically, in step S130, it is determined whether the amount of intake air is within a predetermined range, or whether the catalyst temperature of the upstream-side catalyst 32 is within a predetermined range. These ranges are predetermined as ranges such that a discriminable difference occurs between the oxygen storage capacity OSC of the normal-state catalyst and that of the deteriorated catalyst. Therefore, if it is determined in step S130 that the condition is not met, it can be determined that it is impossible to determine whether the upstream-side catalyst 32 has deteriorated based on the oxygen storage capacity OSC. In this case, the present execution of the routine is promptly ended without any further processing.

Conversely, if it is determined in step S130 that the condition for executing the deterioration determination is met, the ECU 40 then detects the oxygen storage capacity OSC of the upstream-side catalyst 32, and detects the during-detection average catalyst temperature and the during-detection average amount of intake air (step S132).

The aforementioned during-detection average catalyst temperature is an average value of the upstream-side catalyst temperature during the process of detecting the oxygen storage capacity OSC. The during-detection average amount of intake air is an average value of the amount of intake air Ga during the process of detecting the oxygen storage capacity OSC. Specifically, the process of step S132 is accomplished by a series of steps illustrated in FIG. 5.

Figure 5:
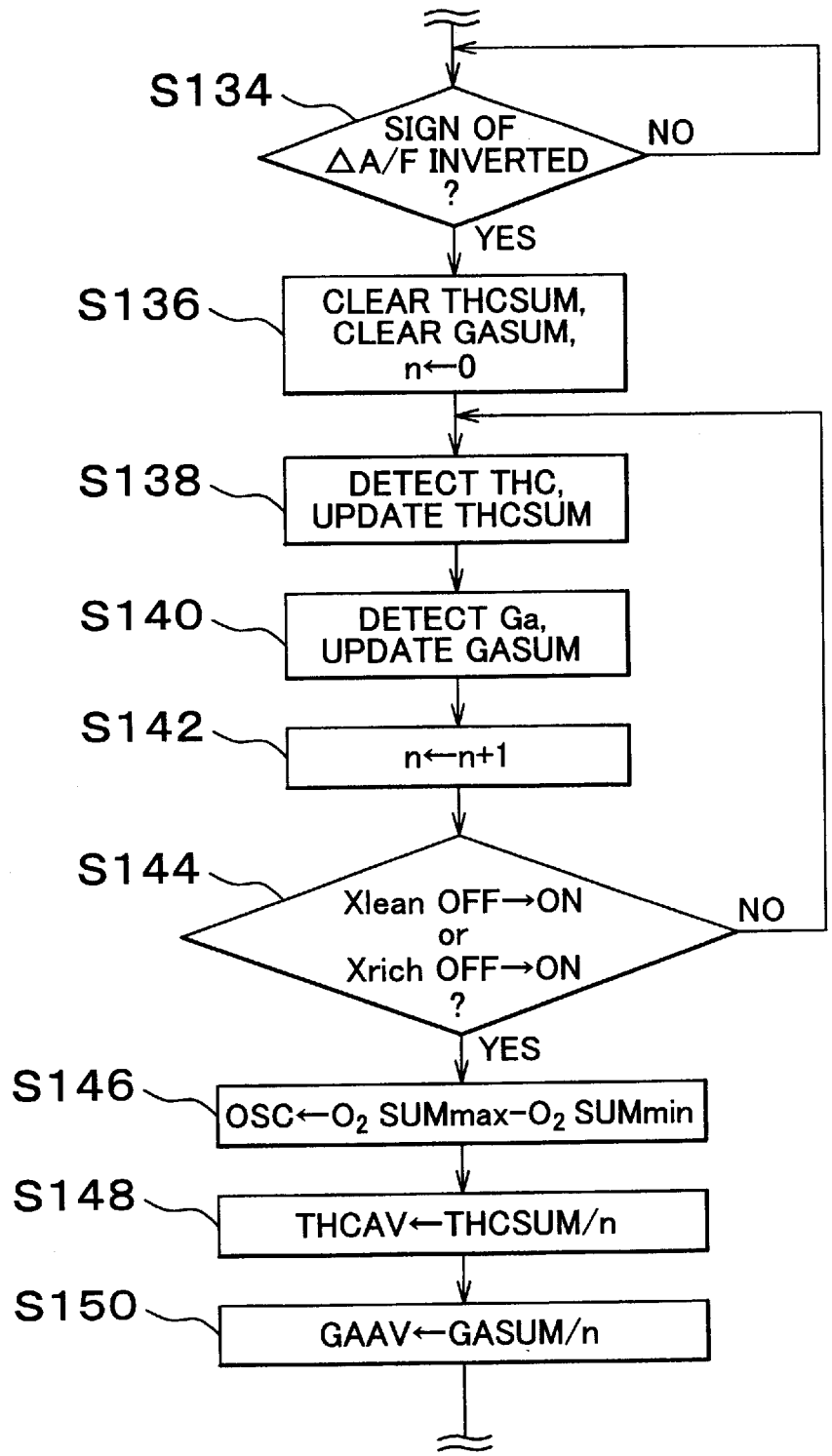
FIG. 5 is a flowchart illustrating a series of steps executed in step S132 in FIG. 4.

In the series of steps illustrated in FIG. 5, it is first determined whether the sign of the air-fuel ratio deviation $\Delta A/F$ is inverted, that is, whether the air-fuel ratio detected by the air-fuel ratio sensor 36 has switched from a value indicating a fuel-rich state to a value indicating a fuel-lean state, or has switched in the opposite direction (step S134).

As described above with reference to FIG. 2, the upstream-side catalyst 32 in the system of the embodiment maintains the maximum oxygen storage state or the minimum oxygen storage state from the inversion of the output of the $O_2$ sensor 38 (e.g., the time point t0 or t2) until the inversion of the sign of the air-fuel ratio deviation $\Delta A/F$ (e.g., the time point t1 or t3). After the sign of the air-fuel ratio deviation $\Delta A/F$ reverses, the integrated oxygen storage $O_2SUM$ indicating the amount of oxygen stored in the upstream-side catalyst 32 starts to be updated. Thus, the process of step S134 makes it possible to detect the time of start of update of the integrated oxygen storage $O_2SUM$.

The process of step S134 is repeatedly executed until it is determined that the sign of the air-fuel ratio deviation $\Delta A/F$ has reversed, that is, until it is determined that update of the integrated oxygen storage $O_2SUM$ has started. After it is determined that the sign of the air-fuel ratio deviation $\Delta A/F$ has reversed, the ECU 40 clears an integrated catalyst temperature value THCSUM and an integrated amount of intake air GASUM described below, and resets a counted number n of times of integration described below to "0" (step S136).

Subsequently, a catalyst temperature THC is detected, and the integrated catalyst temperature value THCSUM is updated on the basis of the detected value of catalyst temperature THC (step S138).

The catalyst temperature THC is the actual temperature of the upstream-side catalyst 32 determined by actual measurement or estimation. In the case of actual measurement, the catalyst temperature THC can be determined by a catalyst temperature sensor attached to the upstream-side catalyst 32. In the case of estimation, the catalyst temperature THC can be determined from the ignition timing, the mixture air-fuel ratio, the amount of intake air Ga, the vehicle speed SPD, the intake air temperature THA, etc., through the use of a pre-set map or computation expression. The integrated catalyst temperature value THCSUM is a value obtained by adding the catalyst temperature THC detected in the present cycle of the routine to the value obtained in the previous cycle.

Subsequently, the amount of intake air Ga is detected, and the integrated amount of intake air GASUM is updated on the basis of the detected value of amount of intake air Ga (step S140). The amount of intake air Ga is actually measured by the air flow meter 20. The integrated amount of intake air GASUM is obtained by adding the amount of intake air Ga detected in the present cycle of the routine to the value obtained in the previous cycle.

Next, the counted number n of times of integration is incremented (step S142). Due to this process, the counted number n of times of integration becomes a value that indicates the number of times of repetitions of the process of steps S138 and S140.

Next, in the series of steps illustrated in FIG. 5, it is determined whether the lean flag Xlean has changed from OFF to ON, or whether the rich flag Xrich has changed from OFF to ON (step S144).

In the system of the embodiment, the lean flag Xlean changes from OFF to ON at the time point when the $O_2$ sensor 38 produces the lean output, as described above. The rich flag Xrich changes from OFF to ON at the time point when the $O_2$ sensor 38 produces the rich output. Such a change in the flags occurs immediately after the upstream-side catalyst 32 reaches the maximum oxygen storage state or the minimum oxygen storage state. Therefore, the process of step S144 makes it possible to detect the time when the upstream-side catalyst 32 reaches the maximum oxygen storage state or the minimum oxygen storage state.

In the series of steps illustrated in FIG. 5, if it is determined in step S144 that the condition is not met, the process starting at step S138 is executed again. The process of steps S138 to S144 is repeated until it is determined in step S144 that the condition is met.

If it is determined in step S144 that the lean flag Xlean has changed from OFF to ON or that the rich flag Xrich has changed from OFF to ON, the oxygen storage capacity OSC is computed as in the following equation (step S146).

$$OSC = O_2SUMmax - O_2SUMmin \qquad (2)$$

According to the routine illustrated in FIG. 3, the maximum integrated oxygen storage $O_2SUMmax$ is stored at the time point when the lean flag Xlean changes from OFF to ON (see step S108). The minimum integrated oxygen storage $O_2SUMmin$ is stored at the time point when the rich flag Xrich changes from OFF to ON (see step S112). According to the process of step S146, every time one of $O_2SUMmax$ and $O_2SUMmin$ is updated to a latest value, the oxygen storage capacity OSC can be computed using the latest value.

Subsequently to the process of step S146 in the series of steps illustrated in FIG. 5, a during-detection average catalyst temperature THCAV is computed. Specifically, the during-detection average catalyst temperature THCAV is computed by dividing the integrated catalyst temperature value THCSUM computed in step S138 by the counted number n of times of integration as in the following equation (step S148).

$$TCHAV = THCSUM/n \quad (3)$$

Subsequently, a during-detection average amount of intake air GAAV is computed. Specifically, the during-detection average amount of intake air GAAV is computed by dividing the integrated amount of intake air GASUM computed in step S140 by the counted number n of times of integration as in the following equation (step S150).

$$GAAV = GASUM/n \quad (4)$$

As described above, according to the series of steps illustrated in FIG. 5, immediately after the upstream-side catalyst 32 reaches the maximum oxygen storage state or the minimum oxygen storage state, the oxygen storage capacity OSC can be computed on the basis of the latest data, and the average value THCAV of catalyst temperature and the average value GAAV of amount of intake air occurring during the process of acquirement of the latest oxygen storage capacity OSC can be determined.

The series of steps illustrated in FIG. 5 is executed in step S132 during execution of the routine illustrated in FIG. 4 as described above. In the routine illustrated in FIG. 4, after the process of step S132 ends, a deterioration determination criterion A(x) is determined on the basis of the during-detection average catalyst temperature THCAV and the during-detection average amount of intake air GAAV computed as described above (step S152).

The ECU 40 stores a map in which the deterioration determination criterion A(x) for discriminating the oxygen storage capacity OSC of the catalyst in a deteriorated state and the oxygen storage capacity OSC of the normal-state catalyst is determined in a relationship with the catalyst temperature and the amount of intake air. In step S152, the deterioration determination criterion A(x) is determined with reference to the map.

Subsequently, it is determined whether the during-detection average catalyst temperature THCAV and the during-detection average amount of intake air GAAV are unbalanced (not balanced) (step S154).

The ECU 40 stores a proper relationship between the catalyst temperature and the amount of intake air. More specifically, the ECU 40 stores a catalyst temperature-intake air amount relationship such that the upstream-side catalyst 32 does not allow a through-flow of unpurified exhaust gas to the downstream side as long as the upstream-side catalyst 32 is normal and is not in either the maximum oxygen storage state or the minimum oxygen storage state. In step S154, it is determined whether the during-detection average catalyst temperature THCAV and the during-detection average amount of intake air GAAV satisfy the relationship.

In the description of the embodiment, the expression that the catalyst temperature and the amount of intake air are "balanced" refers to a state where the two factors satisfy the aforementioned relationship. The expression that the catalyst temperature and the amount of intake air are "not balanced" or "unbalanced" refers to a state where the two factors do not satisfy the relationship.

If it is determined in step S154 that the during-detection average catalyst temperature THCAV and the during-detection average amount of intake air GAAV are not balanced, it can be determined that there is a possibility that the detected value of oxygen storage capacity OSC may not accurately indicate a deteriorated state of the upstream-side catalyst 32.

That is, if the during-detection average amount of intake air GAAV is unreasonably great relatively to the during-detection average catalyst temperature THCAV, it can be determined that there is a possibility that unpurified exhaust gas may have flown out to the downstream side of the upstream-side catalyst 32 during the process of detecting the oxygen storage capacity OSC although the upstream-side catalyst 32 is normal. That is, in this case, it can be determined that there is a possibility that the oxygen storage capacity OSC of the upstream-side catalyst 32 may have been recognized as an unreasonably small value due to a cause other than deterioration.

If the during-detection average catalyst temperature THCAV is unreasonably high relatively to the during-detection average amount of intake air GAAV, it can be determined that there is a possibility that despite deterioration of the upstream-side catalyst 32, the catalyst may have delivered sufficient emission control performance under such condition and therefore may have prevented unpurified exhaust gas from outflowing to the downstream side. That is, in this case, it can be determined that there is a possibility of falsely determining that the catalyst is normal despite actual deterioration of the catalyst because of the emission control performance of the deteriorated catalyst being close to the normal emission control performance.

Therefore, if it is determined in step S154 that the during-detection average catalyst temperature THCAV and the during-detection average amount of intake air GAAV are not balanced, the ECU 40 discards the oxygen storage capacity OSC detected in the present cycle of the routine without using it for determination regarding deterioration of the upstream-side catalyst 32 (step S156).

Conversely, if it is determined in step S154 that the during-detection average catalyst temperature THCAV and the during-detection average amount of intake air GAAV are balanced, the ECU 40 recognizes the oxygen storage capacity OSC as valid data, and determines whether the oxygen storage capacity OSC detected in the present cycle of the routine is greater than the criterion A(x) determined step S152 (step S158).

If it is determined that OSC>A(x) is satisfied, it is determined that the upstream-side catalyst 32 is normal (step S160). Conversely, if it is determined that OSC>A(x) is not satisfied, it is determined that the upstream-side catalyst 32 has deterioration (step S162).

As described above, according to the routine illustrated in FIG. 4, when determination regarding deterioration of the upstream-side catalyst 32 is to be executed, the oxygen storage capacity OSC can be freely detected without any restriction imposed. Therefore, in this embodiment, the oxygen storage capacity OSC can be acquired with high frequency.

Furthermore, according to the routine illustrated in FIG. 4, the oxygen storage capacity OSC detected in a condition where the during-detection average catalyst temperature THCAV and the during-detection average amount of intake air GAAV are not balanced, that is, a condition where the engine 10 is in a transitional state in a macroscopic view, can be excluded from the basic data related to the determination regarding catalyst deterioration. In other words, according to the routine illustrated in FIG. 4, the oxygen storage capacity OSC acquired in a condition where the catalyst temperature and the amount of intake air are generally balanced although they are temporarily unbalanced can be used as valid data related to the basis for determination regarding catalyst deterioration. Therefore, the catalyst deterioration detection apparatus of the embodiment is able to accomplish both the function of executing determination regarding deterioration of the upstream-side catalyst 32 with high precision, and the function of executing the determination with high frequency.

Second Embodiment

A second embodiment of the invention will be described with reference to FIG. 6. The catalyst deterioration detection apparatus of this embodiment is an improvement of the apparatus of the first embodiment that is realized by causing the ECU 40 to execute a routine illustrated in FIG. 6 as well as the routine illustrated in FIG. 3 in the system construction shown in FIG. 1.

Figure 6:
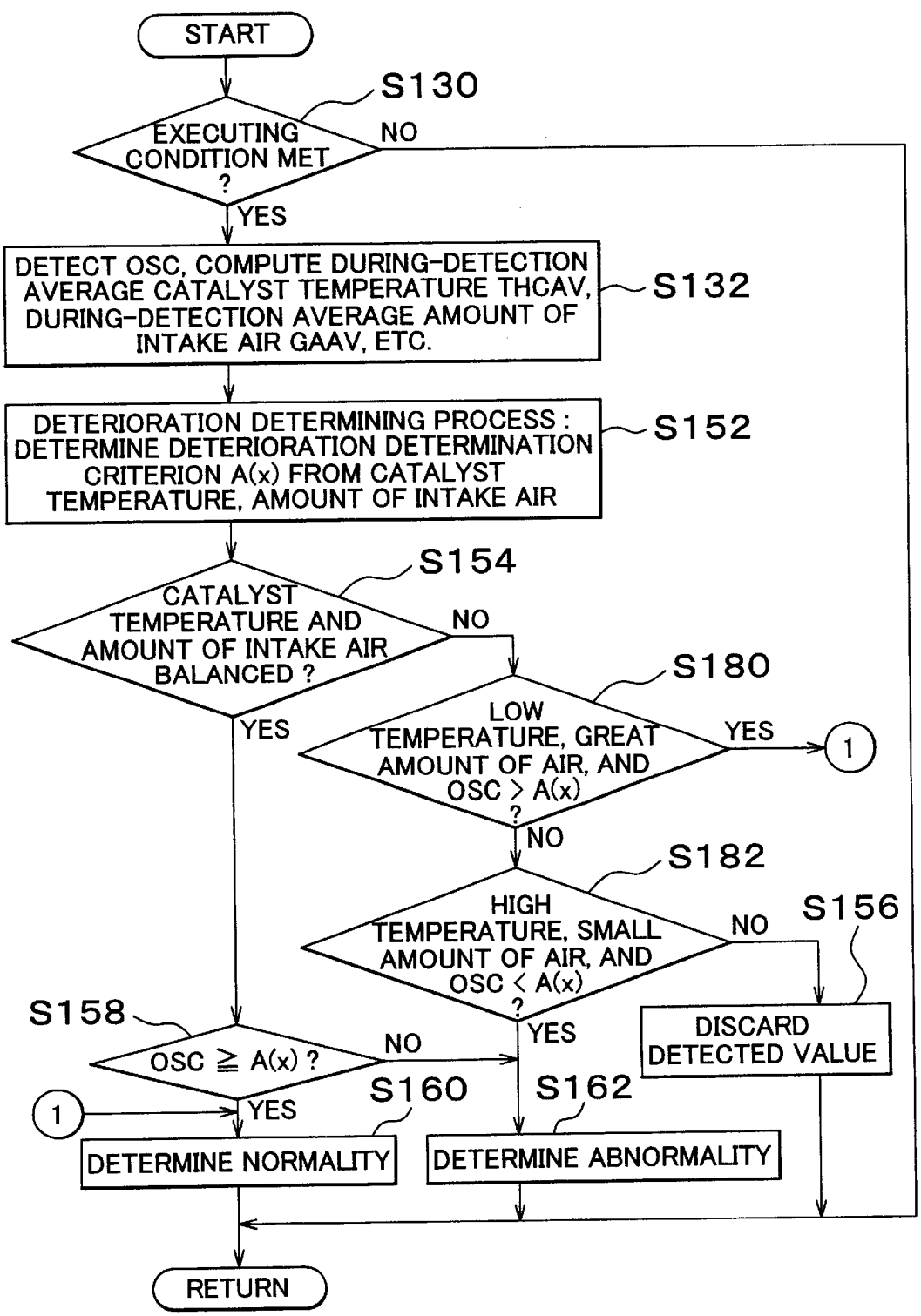
FIG. 6 is a flowchart illustrating a routine executed by a catalyst deterioration detection apparatus in accordance with a second embodiment of the invention to determine deterioration of the upstream-side catalyst based on the oxygen storage capacity.

FIG. 6 is a flowchart illustrating a routine executed by the ECU 40 to perform determination regarding deterioration of the upstream-side catalyst 32 based on the oxygen storage capacity OSC. The routine illustrated in FIG. 6 is substantially the same as the routine illustrated in FIG. 4, except that steps S180 and S182 are executed in certain conditions. Differences of the routine illustrated in FIG. 6 from the routine illustrated in FIG. 4 will be mainly described below.

In the routine illustrated in FIG. 6, if it is determined in step S154 that the during-detection average catalyst temperature THCAV and the during-detection average amount of intake air GAAV are not balanced, it is determined whether the following two conditions are both met (step S180).

1. The during-detection average catalyst temperature THCAV is unreasonably low relative to the during-detection average amount of intake air GAAV, or the during-detection average amount of intake air GAAV is unreasonably great relative to the during-detection average catalyst temperature THCAV.

2. The detected oxygen storage capacity OSC is greater than the deterioration determination criterion A(x).

The condition 1 is met if the oxygen storage capacity OSC is likely to be recognized as an unreasonably small value. In a situation where the condition 1 is met, recognition of the oxygen storage capacity OSC as an unreasonably great value will not occur even if the oxygen storage capacity OSC may be recognized as an unreasonably small value. Therefore, if the condition 2 is met in the aforementioned situation, it can be ensured that the upstream-side catalyst 32 has no deterioration.

In the routine illustrated in FIG. 6, if it is determined in step S180 that both the conditions 1 and 2 are met, step S160 is executed. That is, in this case, the oxygen storage capacity OSC is recognized as a normal value, and therefore, it is determined that the upstream-side catalyst 32 is normal. Therefore, the catalyst deterioration detection apparatus of the embodiment is able to identify a state of deterioration of the upstream-side catalyst 32 with a frequency that is higher than the frequency in the case of the first embodiment.

In the routine illustrated in FIG. 6, if it is determined in step S180 that the condition is not met, it is then determined whether the following two conditions are both met (step S182).

3. The during-detection average catalyst temperature THCAV is unreasonably high relative to the during-detection average amount of intake air GAAV, or the during-detection average amount of intake air GAAV is unreasonably small relative to the during-detection average catalyst temperature THCAV.

4. The detected oxygen storage capacity OSC is less than the deterioration determination criterion A(x).

The condition 3 is a condition where the oxygen storage capacity OSC is likely to be recognized as a value close to the oxygen storage capacity of the normal-state catalyst although the catalyst is deteriorated. That is, in a situation where the condition 3 is met, recognition of the oxygen storage capacity OSC as an unreasonably small value does not occur although an oxygen storage capacity OSC close to that of the normal-state catalyst may be recognized. Therefore, if the condition 4 is met in such a situation, it can be ensured that the upstream-side catalyst 32 has deterioration.

In the routine illustrated in FIG. 6, if it is determined in step S182 that both the conditions 3, 4 are met, step S162 is subsequently executed. That is, in this case, the oxygen storage capacity OSC is recognized as a normal value, and it is determined that the upstream-side catalyst 32 is abnormal. Therefore, the catalyst deterioration detection apparatus of this embodiment is able to identify the state of deterioration of the upstream-side catalyst 32 with higher frequency than the apparatus of the first embodiment.

Furthermore, in the routine illustrated in FIG. 6, if it is determined in step S1182 that the condition is not met, it can be determined that there is a possibility that the detected oxygen storage capacity OSC may not precisely indicate the state of the upstream-side catalyst 32. Therefore, if determination is made in this manner, the process of step S156 is executed, in which the oxygen storage capacity OSC detected in the present operation cycle of the routine is discarded. According to the foregoing operation, it is possible to prevent false determination based on inaccurate oxygen storage capacity OSC, as is the case with the first embodiment.

Third Embodiment

A third embodiment of the invention will be described with reference to FIGS. 7 and 8. An upper graph (A) in FIG. 7 indicates the vehicle speed SPD in a case where the vehicle runs in a pattern of acceleration→steady running→deceleration. An intermediate graph (B) in FIG. 7 indicates changes in the amount of intake air Ga that occur when the vehicle runs in the pattern indicated in the graph (A) of FIG. 7. A lower graph (C) in FIG. 7 indicates changes in the target catalyst temperature (bold line) and changes in the actual catalyst temperature (fine line) corresponding to the amount of intake air Ga indicated in the graph (B) of FIG. 7.

Figure 7:
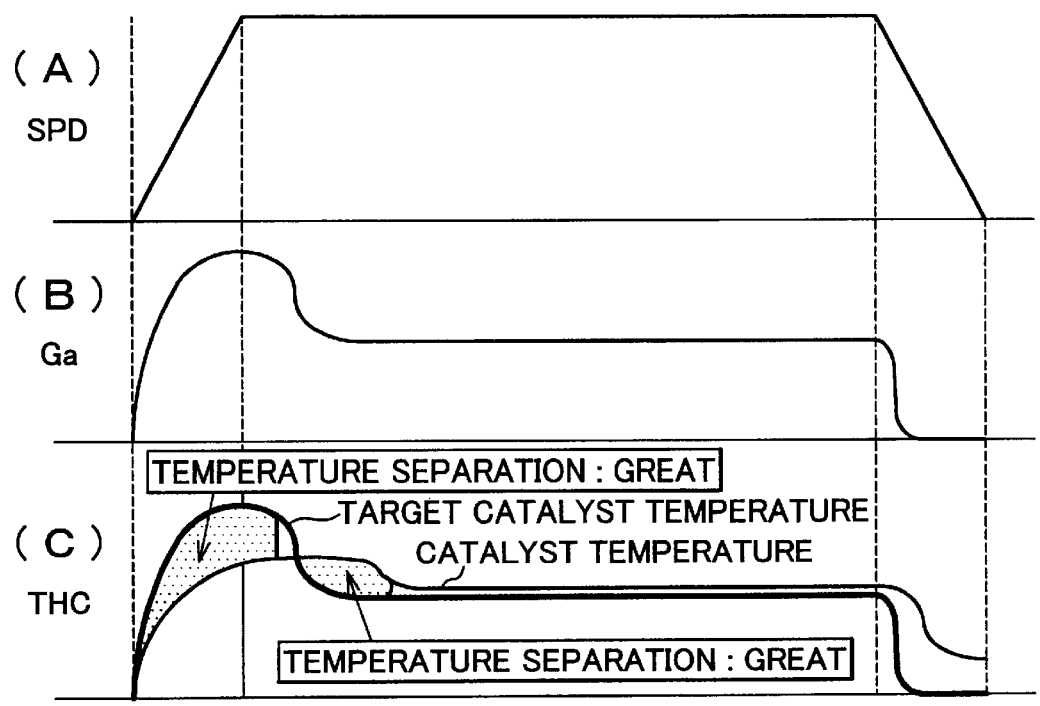
FIG. 7 is a timing chart for explanation of characteristics of a catalyst deterioration detection apparatus in accordance with a third embodiment of the invention.

As indicated in the graph (B) of FIG. 7, the amount of intake air Ga changes temporarily to a great extent during the acceleration of the vehicle. After the vehicle enters the steady running state, the amount of intake air Ga remains stable at a certain amount of flow. After the vehicle starts to decelerate, the amount of intake air Ga changes to smaller values.

The target catalyst temperature indicated in the graph (C) of FIG. 7 is the value of convergence that the catalyst temperature reaches if the instantaneous value of amount of intake air Ga indicated in the graph (B) of FIG. 7 is a steady-state value. As described above in conjunction with the first embodiment, when the state of deterioration of the catalyst is to be determined based on the oxygen storage capacity OSC, it is preferable that the oxygen storage capacity OSC be detected in a situation where the catalyst temperature and the amount of intake air Ga are balanced. The target catalyst temperature indicated in the graph (C) of FIG. 7 is the catalyst temperature that provides ideal balance with respect to the amount of intake air Ga indicated in the graph (B) of FIG. 7. Therefore, for precise determination of the state of deterioration of the catalyst based on the oxygen storage capacity OSC, an ideal situation is that the catalyst temperature exhibits changes along the target catalyst temperature.

In other words, the amount of separation between the target catalyst temperature and the actual catalyst temperature indicated in the graph (C) of FIG. 7 can be understood as a characteristic value that indicates the correlation of the oxygen storage capacity OSC and the state of deterioration of the catalyst. That is, a region where the target catalyst temperature is considerably apart upward from the actual catalyst temperature is a region where even if the catalyst is in a normal state, unpurified exhaust gas is likely to flow out downstream of the catalyst, and therefore, the oxygen storage capacity OSC of the catalyst is likely to be detected as an unreasonably low value. Furthermore, a region where the target catalyst temperature is largely apart downward of the actual catalyst temperature is a region where even if the catalyst is deteriorated, the catalyst is likely to deliver an emission control performance close to the normal performance, and therefore, false determination of the deteriorated catalyst as a normal-state catalyst is likely.

Therefore, the determination as to whether the amount of separation between the target catalyst temperature and the actual catalyst temperature indicated in the graph (C) of FIG. 7 is greater than a predetermined threshold may be considered equivalent to the determination as to whether the during-detection average catalyst temperature THCAV and the during-detection average amount of intake air GAAV are unbalanced in the first embodiment (see step S154). Therefore, the catalyst deterioration detection apparatus of this embodiment executes the former determination so as to determine whether the detected oxygen storage capacity OSC can be used as valid data.

Figure 8:
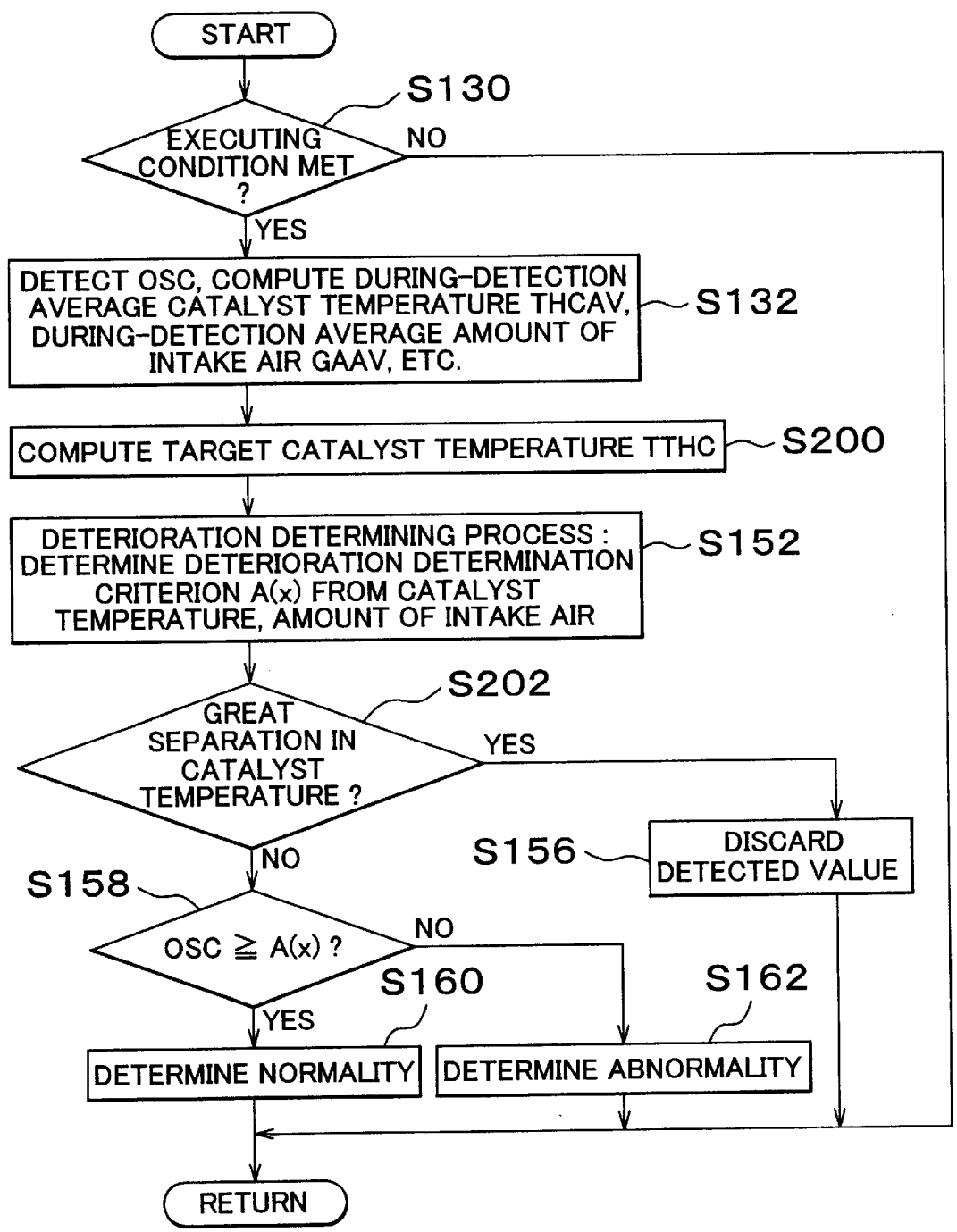
FIG. 8 is a flowchart illustrating a routine executed by the catalyst deterioration detection apparatus of the third embodiment of the invention to determine deterioration of the upstream-side catalyst based on the oxygen storage capacity.

The catalyst deterioration detection apparatus of this embodiment can be realized in the system construction illustrated in FIG. 1 by causing the ECU 40 to execute the routine illustrated in FIG. 3 and the routine illustrated in FIG. 8. FIG. 8 is a flowchart illustrating a routine executed by the ECU 40 to perform determination regarding deterioration of the upstream-side catalyst 32 based on the oxygen storage capacity OSC. Steps in FIG. 8 identical to those shown in FIG. 4 are represented by identical reference characters, and will not be described in detail again.

In the routine illustrated in FIG. 8, after the oxygen storage capacity OSC, the during-detection average catalyst temperature THCAV and the during-detection average amount of intake air GAAV are detected in step S132, a target catalyst temperature TTHC corresponding to the during-detection average amount of intake air GAAV is computed (step S200).

The target catalyst temperature TTHC that corresponds to the during-detection average amount of intake air GAAV is the value of convergence of catalyst temperature that the upstream-side catalyst 32 reaches if the during-detection average amount of intake air GAAV is maintained in a steady manner. In this embodiment, the ECU 40 stores a map in which a relationship between the amount of intake air Ga and the value of convergence of catalyst temperature is determined. In step S200, the target catalyst temperature TTHC is computed with reference to the map.

In the routine illustrated in FIG. 8, the process of step S152 (computation of the deterioration determination criterion A(x)) is subsequently executed. Then, it is determined whether the amount of separation between the target catalyst temperature TTHC and the during-detection average catalyst temperature THCAV is greater than a predetermined criterion (step S202).

The amount of separation between the target catalyst temperature TTHC and the during-detection average catalyst temperature THCAV is the characteristic value that indicates an average degree of unbalance between the catalyst temperature and the amount of intake air Ga occurring during detection of the oxygen storage capacity OSC. The aforementioned predetermined criterion is a value for determining whether the degree of unbalance is great so that the accuracy of the oxygen storage capacity OSC is lost. The criterion is empirically determined.

Therefore, if it is determined that the amount of separation is greater than a predetermined criterion, it can be determined that there is a possibility that the oxygen storage capacity OSC detected in the present cycle of the routine may lack accuracy. In the routine illustrated in FIG. 8, if such determination is made in step S202, the oxygen storage capacity OSC is subsequently discarded in step S156.

If it is determined in step S202 that the amount of separation between the target catalyst temperature TTHC and the during-detection average catalyst temperature THCAV is not greater than the predetermined criterion, it can be determined that the oxygen storage capacity OSC detected in the present cycle of the routine is a proper value. In this case, the process starting at step S158 is subsequently executed to perform determination regarding deterioration of the upstream-side catalyst 32 based on the value of oxygen storage capacity OSC.

As described above, the routine illustrated in FIG. 8 makes it possible to detect the oxygen storage capacity OSC without taking the operation state of the engine 10 into account, and then determine whether to recognize the oxygen storage capacity OSC as a proper value in an ex-post manner while factoring in a macroscopic situation occurring at the time of detection of the oxygen storage capacity OSC, similarly to the routine illustrated in FIG. 4. Therefore, the catalyst deterioration detection apparatus of this embodiment is able to perform determination regarding deterioration of the upstream-side catalyst 32 with good precision and high frequency, as in the first embodiment.

In the third embodiment, the amount of separation between the target catalyst temperature TTHC and the during-detection average catalyst temperature THCAV may be provided with a suitable sign in accordance with the magnitude relationship between the two values (see step S202). Adoption of this measure allows discrimination between a case where the target catalyst temperature TTHC is excessive relative to the during-detection average catalyst temperature THCAV and a case where the during-detection average catalyst temperature THCAV is excessive relative to the target catalyst temperature TTHC. It is also possible to set difference criterions for the individual cases in step S202 for determination as to whether there is a separation between the two temperatures.

Fourth Embodiment

A fourth embodiment of the invention will be described with reference to FIG. 9. The catalyst deterioration detection apparatus of this embodiment is an improvement of the apparatus of the third embodiment that is realized in the system construction shown in FIG. 1 by causing the ECU 40 to execute a routine illustrated in FIG. 9 as well as the routine illustrated in FIG. 3.

Figure 9:
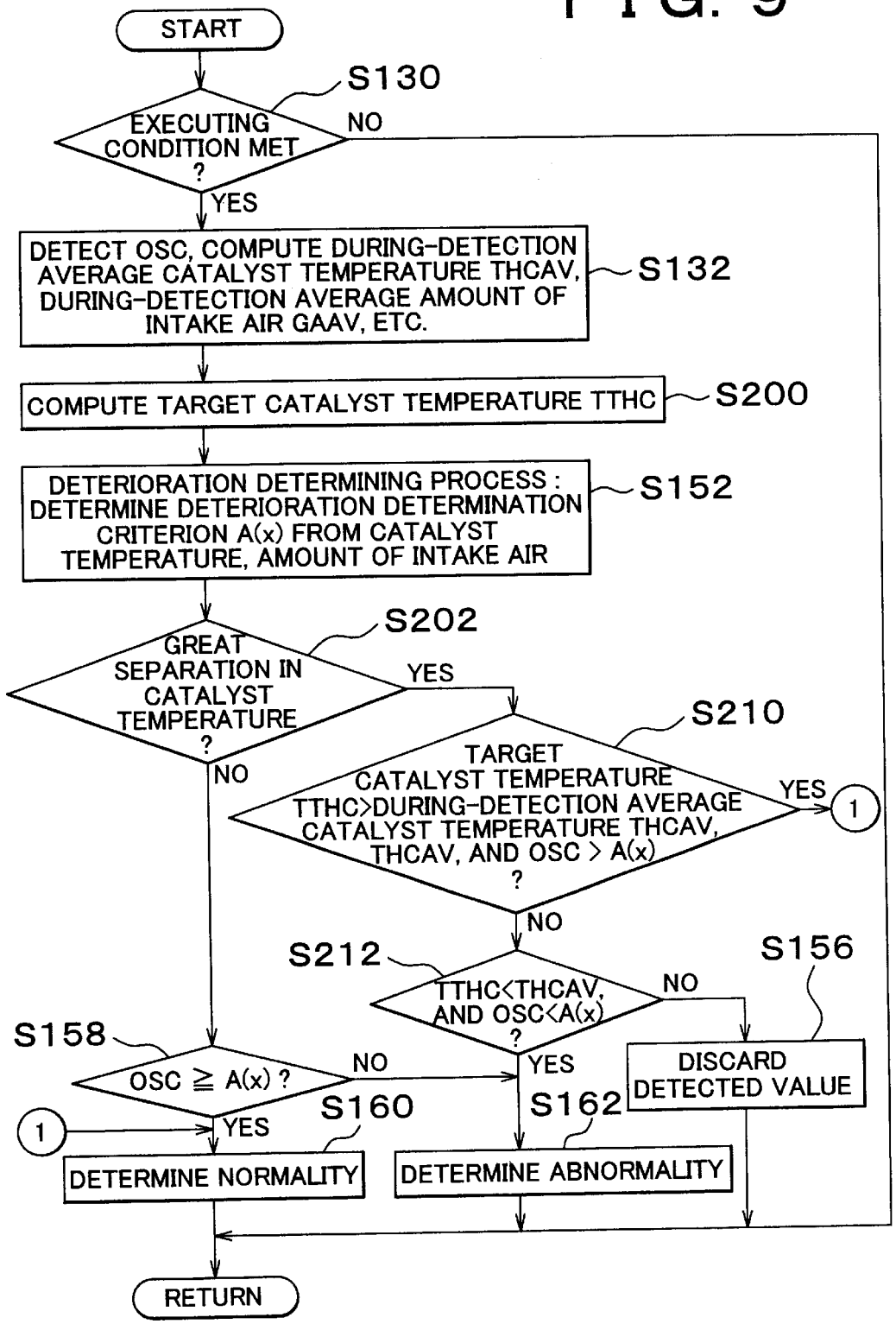
FIG. 9 is a flowchart illustrating a routine executed by a catalyst deterioration detection apparatus of a fourth embodiment of the invention to determine deterioration of the upstream-side catalyst based on the oxygen storage capacity.

FIG. 9 is a flowchart illustrating a routine executed by the ECU 40 to perform determination regarding deterioration of the upstream-side catalyst 32 based on the oxygen storage capacity OSC. The routine illustrated in FIG. 9 is substantially the same as the routine illustrated in FIG. 8, except that steps S210 and S212 are executed subsequently to step S202. Differences of the routine illustrated in FIG. 9 from the routine illustrated in FIG. 8 will be mainly described below.

In the routine illustrated in FIG. 9, if it is determined in step S202 that the target catalyst temperature TTHC and the during-detection average catalyst temperature THCAV are largely apart from each other, it is determined whether the following two conditions are both met (step S210).

1. The target catalyst temperature TTHC is higher than the during-detection average catalyst temperature THCAV.
2. The detected oxygen storage capacity OSC is greater than the deterioration determination criterion A(x).

The condition 1 is equivalent to the condition that the catalyst temperature is unreasonably low relative to the amount of intake air. The condition 1 is met in a case where the oxygen storage capacity OSC is likely to be recognized as an unreasonably small value. In a situation where the condition 1 is met, recognition of the oxygen storage capacity OSC as an unreasonably great value will not occur even if the oxygen storage capacity OSC may be recognized as an unreasonably small value. Therefore, if the condition 2 is met in the aforementioned situation, it can be ensured that the upstream-side catalyst 32 has no deterioration.

In the routine illustrated in FIG. 9, if it is determined in step S210 that both the conditions 1 and 2 are met, step S160 is executed. That is, in this case, the oxygen storage capacity OSC is recognized as a normal value, and therefore, it is determined that the upstream-side catalyst 32 is normal. Therefore, the catalyst deterioration detection apparatus of the embodiment is able to identify a state of deterioration of the upstream-side catalyst 32 with a frequency that is higher than the frequency in the case of the third embodiment.

In the routine illustrated in FIG. 9, if it is determined in step S210 that the condition is not met, it is then determined whether the following two conditions are both met (step S212).

3. The target catalyst temperature TTHC is lower than the during-detection average catalyst temperature THCAV.
4. The detected oxygen storage capacity OSC is less than the deterioration determination criterion A(x).

The condition 3 is equivalent to the condition that the catalyst temperature is unreasonably high relative to the amount of intake air, and is a condition where the oxygen storage capacity OSC is likely to be recognized as a value close to the oxygen storage capacity of the normal-state catalyst although the catalyst is deteriorated. That is, in a situation where the condition 3 is met, recognition of the oxygen storage capacity OSC as an unreasonably small value does not occur although an oxygen storage capacity OSC close to that of the normal-state catalyst may be recognized. Therefore, if in such a situation, the condition 4 is met, it can be ensured that the upstream-side catalyst 32 has deterioration.

In the routine illustrated in FIG. 9, if it is determined in step S212 that both the conditions 3, 4 are met, the process of step S162 is subsequently executed. That is, in this case, the oxygen storage capacity OSC is recognized as a normal value, and it is determined that the upstream-side catalyst 32 is abnormal. Therefore, the catalyst deterioration detection apparatus of this embodiment is able to identify the state of deterioration of the upstream-side catalyst 32 with higher frequency than the apparatus of the third embodiment.

Furthermore, in the routine illustrated in FIG. 9, if it is determined in step S212 that the condition is not met, it can be determined that there is a possibility that the detected oxygen storage capacity OSC may not precisely indicate the state of the upstream-side catalyst 32. Therefore, if determination is made in this manner, the process of step S156 is executed, in which the oxygen storage capacity OSC detected in the present operation cycle of the routine is discarded. According to the foregoing operation, it is possible to prevent false determination based on inaccurate oxygen storage capacity OSC, as is the case with the third embodiment.

Although in the first to fourth embodiments, a signal oxygen storage capacity OSC is used as a basis for determining whether the upstream-side catalyst 32 is normal or is deteriorated (see steps S158 to S162), the technique of determination is not limited to this. In one technique, for example, the determination as to whether the upstream-side catalyst 32 is normal is performed a plurality of times based on individual oxygen storage capacities OSC, and a final determination is made based on majority rule regarding the results of these determinations. In another technique, the determination as to whether the upstream-side catalyst 32 is normal is accomplished by detecting a plurality of values of the oxygen storage capacity OSC, and determining whether the mean of the detected values is greater than the deterioration determination criterion A(x).

Fifth Embodiment

A fifth embodiment of the invention will be described with reference to FIG. 10. The catalyst deterioration detection apparatus of this embodiment is realized in any one of the apparatus of the first to fourth embodiments by causing the apparatus to execute a routine illustrated in FIG. 10 in addition to the above-described routines.

As mentioned above with reference to FIG. 7, in order to detect the oxygen storage capacity OSC in which the state of deterioration of the catalyst is accurately reflected, it is desirable that at the time of detection, the actual catalyst temperature be equal to the target catalyst temperature TTHC corresponding to the amount of intake air Ga (the value of convergence that the catalyst temperature reaches on the assumption that the instantaneous value of amount of intake air Ga is a steady-state value).

Figure 10:
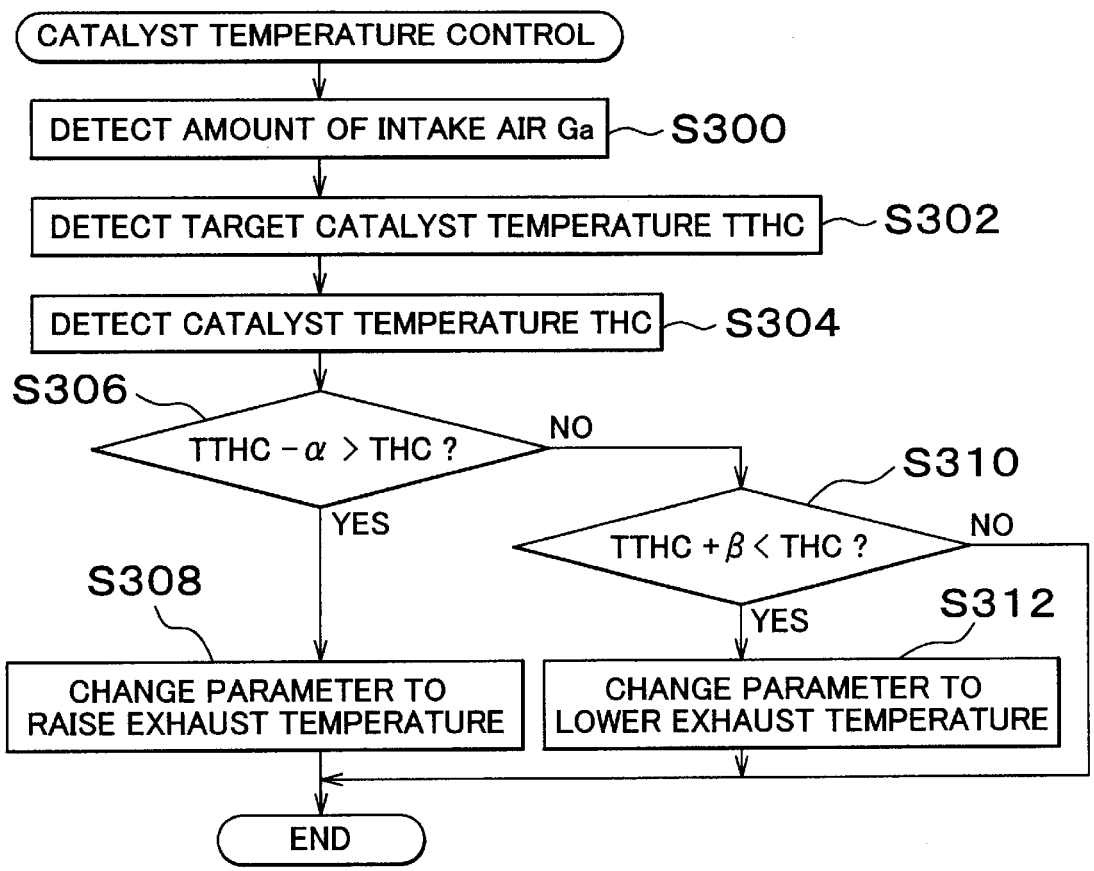
FIG. 10 is a flowchart illustrating a routine executed by a catalyst deterioration detection apparatus of a fifth embodiment of the invention to bring the catalyst temperature of the upstream-side catalyst closer to a target catalyst temperature.
Figure 11:
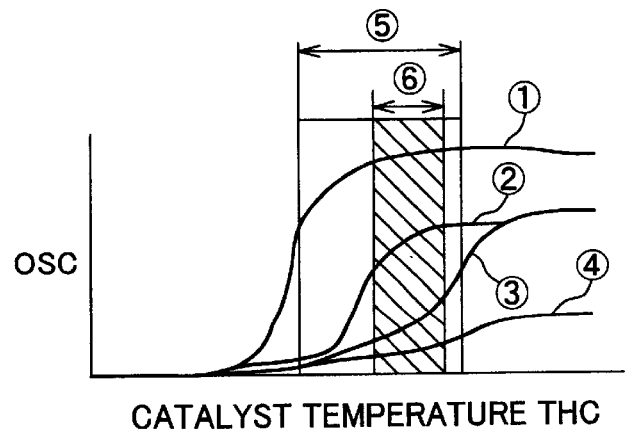
FIG. 11 is a diagram indicating relationships between the catalyst temperature and the oxygen storage capacity of the catalyst.
Figure 12A:
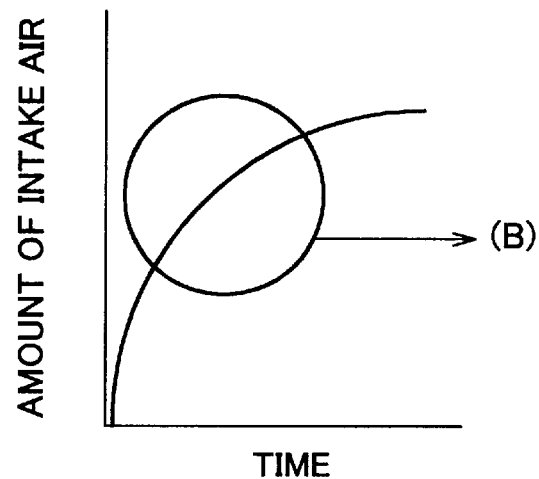
FIG. 12A is a diagram for explanation of problems of a conventional catalyst deterioration detection apparatus, indicating a case where the operation state of a vehicle is an accelerating state in a macroscopic view.
Figure 12B:
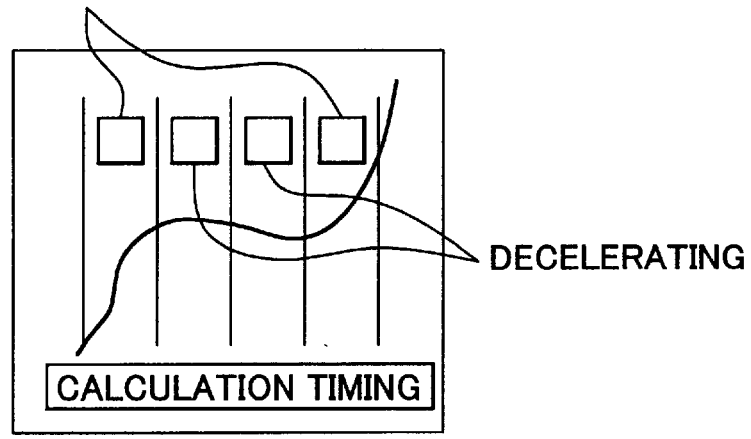
FIG. 12B is a diagram for explanation of problems of the conventional catalyst deterioration detection apparatus, indicating a case where the operation state of the vehicle repeatedly enters an accelerating state and a decelerating state in a microscopic view while remaining in an accelerating state in a macroscopic view.

FIG. 10 is a flowchart illustrating a routine executed by the ECU 40 to bring the actual catalyst temperature closer to the target catalyst temperature corresponding to the amount of intake air Ga.

In the routine illustrated in FIG. 10, the ECU 40 first detects the amount of intake air Ga (step S300). Subsequently, the ECU 40 detects the target catalyst temperature TTHC corresponding to the amount of intake air Ga with reference to a map pre-stored in the ECU 40 (step S302).

Subsequently, the catalyst temperature THC of the upstream-side catalyst 32 is detected through actual measurement or estimation (step S304) by a technique similar to the technique used in the first embodiment (see step S138).

In the routine illustrated in FIG. 10, it is determined whether the catalyst temperature THC is sufficiently lower than the target catalyst temperature TTHC, that is, whether $TTHC-\alpha>THC$ ($\alpha$ is a constant for providing a dead zone) is satisfied (step S306).

If it is determined that the condition is met, it can be determined that there is a great separation between the catalyst temperature THC and the target catalyst temperature TTHC. In this case, an exhaust parameter that determines the exhaust temperature is controlled so as to raise the exhaust temperature (step S308).

Conversely, if it is determined in step S306 that $TTHC-\alpha>THC$ is not satisfied, it is subsequently determined whether the catalyst temperature THC is sufficiently greater than the target catalyst temperature TTHC, that is, whether TTHC+β<THC (β is a constant for providing a dead zone) is satisfied (step S310).

If it is determined that the condition is met, it can be determined that there is a great separation between the catalyst temperature THC and the target catalyst temperature TTHC. In this case, the exhaust parameter that determines the exhaust temperature is controlled so as to lower the exhaust temperature (step S312).

Conversely, if it is determined in step S310 that TTHC+β<THC is not satisfied, it is determined that the catalyst temperature THC and the target catalyst temperature TTHC are not separated to an extent that requires correction. After that, the present execution of the routine ends without any further processing.

In steps S308 and S312, the ignition timing, the air-fuel ratio A/F, the amount of intake air Ga, or the like is controlled as an exhaust parameter as mentioned above so that the output of the engine 10 does not change. According to this operation, it is possible to bring the catalyst temperature of the upstream-side catalyst 32 closer to the target catalyst temperature, that is, create a situation where detection of an excessively small oxygen storage capacity OSC is unlikely, without discomforting a driver of the vehicle. Therefore, the catalyst deterioration detection apparatus of this embodiment is able to accurately detect the oxygen storage capacity OSC in a broader operation region and achieve a higher frequency of incidents where accurate determination regarding catalyst deterioration is allowed than the apparatus of the first to third embodiments.

Although in the first to fifth embodiments, the catalyst deterioration detection apparatus detects the oxygen storage capacity OSC while forcibly controlling the mixture air-fuel ratio A/F to the fuel-rich or fuel-lean side, and determines the state of deterioration of the upstream-side catalyst 32 based on the oxygen storage capacity OSC, the technique of determining the state of deterioration of the upstream-side catalyst 32 is not limited to this. For example, the state of deterioration of the upstream-side catalyst 32 may be detected as a deterioration characteristic value, such as the locus ratio, the locus length, etc., and may be determined based on the detected value.

The aforementioned locus ratio refers to the ratio ($\gamma/\delta$) between the change $\gamma$ in the output of the $O_2$ sensor 38 disposed downstream of the upstream-side catalyst 32 and the change $\delta$ in the output of the air-fuel ratio sensor 36 (which may be replaced by an $O_2$ sensor) disposed upstream of the upstream-side catalyst 32, the changes occurring while the air-fuel ratio A/F of the mixture gas is controlled in accordance with a normal rule. If the upstream-side catalyst 32 delivers sufficient emission control capability, outflow of unpurified exhaust gas to the downstream side of the catalyst is unlikely. Therefore, in this case, the locus ratio ($\gamma/\delta$) becomes sufficiently small in value. Conversely, as the upstream-side catalyst 32 deteriorates, outflow of unpurified exhaust gas to the downstream side of the catalyst becomes likely, and the locus ratio ($\gamma/\delta$) approaches "1". In this manner, the locus ratio ($\gamma/\delta$) can be used as a deterioration characteristic value that indicates the state of deterioration of the upstream-side catalyst 32. Therefore, in the first to fourth embodiments, the determination as to whether the upstream-side catalyst 32 is normal (see step S158) may be accomplished based on whether the locus ratio ($\gamma/\delta$) is less than a predetermined value.

The aforementioned locus length refers to a cumulative value of periods during which the $O_2$ sensor 38 disposed downstream of the upstream-side catalyst 32 produces the rich output or the lean output during a predetermined period while the mixture air-fuel ratio A/F is controlled in accordance with a normal rule. If the upstream-side catalyst 32 delivers sufficient emission control capability, the opportunities of the $O_2$ sensor 38 producing the rich output or the lean output reduce, so that the locus length reduces. Conversely, as the upstream-side catalyst 32 deteriorates, outflow of unpurified exhaust gas to the downstream side of the catalyst becomes likely, and the locus length increases. Thus, the locus length can be used as a deterioration characteristic value that indicates the state of deterioration of the upstream-side catalyst 32. Therefore, in the first to fourth embodiments, the determination as to whether the upstream-side catalyst 32 is normal (see step S158) may be accomplished based on whether the locus length is less than a predetermined value.

The controller (e.g., the ECU 40) of the illustrated exemplary embodiments is implemented as one or more programmed general purpose computers. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A catalyst deterioration detection apparatus for detecting deterioration of a catalyst provided in an exhaust passage of an internal combustion engine, comprising a controller that:

determines a deterioration characteristic value that indicates a state of deterioration of the catalyst;

determines a temperature of the catalyst occurring at a time of the determination of the deterioration characteristic value, as a detection-time catalyst temperature;

determines an amount of intake air occurring at the time of the determination of the deterioration characteristic value, as a detection-time amount of air;

determines whether the detection-time catalyst temperature and the detection-time amount of air satisfy a predetermined relationship; and prohibits a determination of the state of deterioration of the catalyst based on the deterioration characteristic value if the detection-time catalyst temperature and the detection-time amount of air do not satisfy the predetermined relationship, wherein the controller determines the deterioration characteristic value even if the detection-time catalyst temperature and the detection-time amount of air do not satisfy the predetermined relationship.

2. The catalyst deterioration detection apparatus according to claim 1, wherein the controller further determines the state of deterioration of the catalyst based on the deterioration characteristic value.

3. The catalyst deterioration detection apparatus according to claim 2, wherein if the detection-time catalyst temperature and the detection-time amount of air do not satisfy the predetermined relationship, the controller discards the deterioration characteristic value so as to avoid a use of the deterioration characteristic value for the determination of the state of deterioration of the catalyst.

4. The catalyst deterioration detection apparatus according to claim 3, wherein if the controller provides a normality determination result that the deterioration characteristic value is a normal value, the controller recognizes the normality determination result as a valid result, in a case where the detection-time catalyst temperature is lower than a catalyst temperature corresponding to the detection-time amount of air in comparison with the predetermined relationship.

5. The catalyst deterioration detection apparatus according to claim 3, wherein if the controller provides an abnormality determination result that the deterioration characteristic value is an abnormal value, the controller recognizes the abnormality determination result as a valid result, in a case where the detection-time catalyst temperature is higher than a catalyst temperature corresponding to the detection-time amount of air in comparison with the predetermined relationship.

6. The catalyst deterioration detection apparatus according to claim 2, wherein if the controller provides a normality determination result that the deterioration characteristic value is a normal value, the controller recognizes the normality determination result as a valid result, in a case where the detection-time catalyst temperature is lower than a catalyst temperature corresponding to the detection-time amount of air in comparison with the predetermined relationship.

7. The catalyst deterioration detection apparatus according to claim 2, wherein if the controller provides an abnormality determination result that the deterioration characteristic value is an abnormal value, the controller recognizes the abnormality determination result as a valid result, in a case where the detection-time catalyst temperature is higher than a catalyst temperature corresponding to the detection-time amount of air in comparison with the predetermined relationship.

8. The catalyst deterioration detection apparatus according to claim 1, wherein the controller:
    sets a target catalyst temperature based on the amount of intake air; and
    changes an exhaust parameter that determines an exhaust temperature, in such a manner that the catalyst temperature approaches the target catalyst temperature corresponding to the amount of intake air.

9. The catalyst deterioration detection apparatus according to claim 1, wherein the controller detects an oxygen storage capacity of the catalyst as the deterioration characteristic value.

10. A catalyst deterioration detection apparatus for detecting deterioration of a catalyst provided in an exhaust passage of an internal combustion engine, comprising a controller that:
    determines a deterioration characteristic value that indicates a state of deterioration of the catalyst;
    determines a temperature of the catalyst occurring at a time of the determination of the deterioration characteristic value, as a detection-time catalyst temperature;
    determines an amount of intake air occurring at the time of the determination of the deterioration characteristic value, as a detection-time amount of air;
    calculates a target catalyst temperature based on the detection-time amount of air;
    calculates an amount of separation between the detection-time catalyst temperature and the target catalyst temperature; and
    prohibits a determination of the state of deterioration of the catalyst based on the deterioration characteristic value if the amount of separation is greater than a predetermined amount, wherein the controller determines the deterioration characteristic value even if the detection-time catalyst temperature and the detection-time amount of air do not satisfy the predetermined relationship.

11. The catalyst deterioration detection apparatus according to claim 10, wherein the controller further determines the state of deterioration of the catalyst based on the deterioration characteristic value.

12. The catalyst deterioration detection apparatus according to claim 11, wherein if the amount of separation is greater than the predetermined amount, the controller discards the deterioration characteristic value so as to avoid a use of the deterioration characteristic value for the determination of the state of deterioration of the catalyst.

13. The catalyst deterioration detection apparatus according to claim 12, wherein if the controller provides a normality determination result that the deterioration characteristic value is a normal value, the controller recognizes the normality determination result as a valid result, in a case where the detection-time catalyst temperature is lower than the target catalyst temperature by more than the predetermined amount, in comparison with the predetermined relationship.

14. The catalyst deterioration detection apparatus according to claim 12, wherein if the controller provides an abnormality determination result that the deterioration characteristic value is an abnormal value, the controller recognizes the abnormality determination result as a valid result, in a case where the detection-time catalyst temperature is higher than the target catalyst temperature by more than the predetermined amount, in comparison with the predetermined relationship.

15. The catalyst deterioration detection apparatus according to claim 11, wherein if the controller provides a normality determination result that the deterioration characteristic value is a normal value, the controller recognizes the normality determination result as a valid result, in a case where the detection-time catalyst temperature is lower than the target catalyst temperature by more than the predetermined amount, in comparison with the predetermined relationship.

16. The catalyst deterioration detection apparatus according to claim 11, wherein if the controller provides an abnormality determination result that the deterioration characteristic value is an abnormal value, the controller recognizes the abnormality determination result as a valid result, in a case where the detection-time catalyst temperature is higher than the target catalyst temperature by more than the predetermined amount, in comparison with the predetermined relationship.

17. The catalyst deterioration detection apparatus according to claim 10, wherein the controller:
   sets a target catalyst temperature based on the amount of intake air; and
   changes an exhaust parameter that determines an exhaust temperature, in such a manner that the catalyst temperature approaches the target catalyst temperature corresponding to the amount of intake air.

18. The catalyst deterioration detection apparatus according to claim 10, wherein the controller detects an oxygen storage capacity of the catalyst as the deterioration characteristic value.

19. A catalyst deterioration detection method for detecting deterioration of a catalyst provided in an exhaust passage of an internal combustion engine, comprising:
   determining a deterioration characteristic value that indicates a state of deterioration of the catalyst;
   determining a temperature of the catalyst occurring at a time of the determination of the deterioration characteristic value, as a detection-time catalyst temperature;
   determining an amount of intake air occurring at the time of the determination of the deterioration characteristic value, as a detection-time amount of air;
   determining whether the detection-time catalyst temperature and the detection-time amount of air satisfy a predetermined relationship; and
   prohibiting a determination of the state of deterioration of the catalyst based on the deterioration characteristic value if the detection-time catalyst temperature and the detection-time amount of air do not satisfy the predetermined relationship wherein determining the deterioration characteristic value occurs even if the detection-time catalyst temperature and the detection-time amount of air do not satisfy the predetermined relationship.

20. The catalyst deterioration detection method according to claim 19, further comprising:
   determining the state of deterioration of the catalyst based on the deterioration characteristic value.

21. The catalyst deterioration detection method according to claim 20, wherein if the detection-time catalyst temperature and the detection-time amount of air do not satisfy the predetermined relationship, the deterioration characteristic value is discarded so that the deterioration characteristic value is not used for the determination of the state of deterioration.

22. The catalyst deterioration detection method according to claim 20, wherein if a normality determination result that the deterioration characteristic value is a normal value is provided in a case where the detection-time catalyst temperature is lower than a catalyst temperature corresponding to the detection-time amount of air in comparison with the predetermined relationship, the normality determination result is recognized as a valid result.

23. The catalyst deterioration detection method according to claim 20, wherein if an abnormality determination result that the deterioration characteristic value is an abnormal value is provided in a case where the detection-time catalyst temperature is higher than a catalyst temperature corresponding to the detection-time amount of air in comparison with the predetermined relationship, the abnormality determination result is recognized as a valid result.

24. The catalyst deterioration detection method according to claim 19, further comprising:
   setting a target catalyst temperature corresponding to the amount of intake air; and
   changing an exhaust parameter that determines an exhaust temperature, in such a manner that the catalyst temperature approaches the target catalyst temperature corresponding to the amount of intake air.

25. The catalyst deterioration detection method according to claim 19, wherein the deterioration characteristic value includes an oxygen storage capacity of the catalyst.

26. A catalyst deterioration detection method for detecting deterioration of a catalyst provided in an exhaust passage of an internal combustion engine, comprising:
   determining a deterioration characteristic value that indicates a state of deterioration of the catalyst;
   determining a temperature of the catalyst occurring at a time of the determination of the deterioration characteristic value, as a detection-time catalyst temperature;
   determining an amount of intake air occurring at the time of the determination of the deterioration characteristic value, as a detection-time amount of air;
   calculating a target catalyst temperature corresponding to the detection-time amount of air;
   calculating an amount of separation between the detection-time catalyst temperature and the target catalyst temperature; and
   prohibiting a determination of the state of deterioration of the catalyst based on the deterioration characteristic value if the amount of separation is greater than a predetermined amount, wherein determining the deterioration characteristic value occurs even if the detection-time catalyst temperature and the detection-time amount of air do not satisfy the predetermined relationship.

27. The catalyst deterioration detection method according to claim 26, further comprising:
   determining the state of deterioration of the catalyst based on the deterioration characteristic value.

28. The catalyst deterioration detection method according to claim 27, wherein if the amount of separation is greater than the predetermined amount, the deterioration characteristic value is discarded so that the deterioration characteristic value is not used for the determination of the state of deterioration.

29. The catalyst deterioration detection method according to claim 27, wherein if a normality determination result that the deterioration characteristic value is a normal value is provided in a case where the detection-time catalyst temperature is lower than the target catalyst temperature by more than the predetermined amount in comparison with the predetermined relationship, the normality determination result is recognized as a valid result.

30. The catalyst deterioration detection method according to claim 27, wherein if an abnormality determination result that the deterioration characteristic value is an abnormal value is provided in a case where the detection-time catalyst temperature is higher than the target catalyst temperature by more than the predetermined amount in comparison with the predetermined relationship, the abnormality determination result is recognized as a valid result.

31. The catalyst deterioration detection method according to claim 26, further comprising:
   setting a target catalyst temperature corresponding to the amount of intake air; and
   changing an exhaust parameter that determines an exhaust temperature, in such a manner that the catalyst temperature approaches the target catalyst temperature corresponding to the amount of intake air.

32. The catalyst deterioration detection method according to claim 26, wherein the deterioration characteristic value includes an oxygen storage capacity of the catalyst.

* * * * *